United States Patent
Virkar et al.

(10) Patent No.: US 11,633,659 B2
(45) Date of Patent: Apr. 25, 2023

(54) SYSTEMS AND METHODS FOR ASSESSING BALANCE AND FORM DURING BODY MOVEMENT

(71) Applicant: MirrorAR LLC, Rockville, MD (US)

(72) Inventors: Hemant Virkar, Darnestown, MD (US); Leah R. Kaplan, Honolulu, HI (US); Stephen Furlani, Gaithersburg, MD (US); Jacob Borgman, Ipswich, MA (US); Anil Bhave, Timonium, MD (US)

(73) Assignee: MirrorAR LLC, Rockville, MD (US)

( * ) Notice: Subject to any disclaimer, the term of this patent is extended or adjusted under 35 U.S.C. 154(b) by 16 days.

(21) Appl. No.: 17/361,447

(22) Filed: Jun. 29, 2021

(65) Prior Publication Data
US 2021/0322856 A1    Oct. 21, 2021

Related U.S. Application Data

(63) Continuation-in-part of application No. 16/570,369, filed on Sep. 13, 2019, now Pat. No. 11,069,144.
(Continued)

(51) Int. Cl.
*A63B 71/06* (2006.01)
*G06T 7/70* (2017.01)
(Continued)

(52) U.S. Cl.
CPC ...... *A63B 71/0622* (2013.01); *A63B 24/0062* (2013.01); *A63B 71/0669* (2013.01);
(Continued)

(58) Field of Classification Search
None
See application file for complete search history.

(56) References Cited

U.S. PATENT DOCUMENTS

2014/0347392 A1* 11/2014 Odessky ............... G06T 13/40
                                                        345/633
2017/0368413 A1* 12/2017 Shavit ............... A63B 24/0075
(Continued)

FOREIGN PATENT DOCUMENTS

WO    2018/148674 A1    8/2018

OTHER PUBLICATIONS

International Search Report for PCT/US2019/051197 dated Dec. 4, 2019.

*Primary Examiner* — Kee M Tung
*Assistant Examiner* — Jed-Justin Imperial
(74) *Attorney, Agent, or Firm* — ArentFox Schiff LLP

(57) ABSTRACT

The disclosure relates to a system for evaluating movement of a body of a user. The system may include a video display, one or more digital cameras, and a processor. The processor may control the one or more cameras to generate images of at least the part of the body over a period of time. The processor may estimate a position of a plurality of joints of the body. The processor may receive a selection of a tracked pose, and determine, from the plurality of joints, a set of joints associated with the tracked pose. The processor may generate at least one joint vector connecting joints in the set of joints, and assign, based on changes in the joint vector over the period of time, a form score to a performance of the tracked pose. The processor may then generate a user interface that depicts the form score.

8 Claims, 14 Drawing Sheets

Related U.S. Application Data

(60) Provisional application No. 62/731,744, filed on Sep. 14, 2018.

(51) Int. Cl.
    *G06T 7/20*       (2017.01)
    *G06K 9/62*       (2022.01)
    *G06T 7/55*       (2017.01)
    *G06T 19/00*     (2011.01)
    *H04N 7/14*       (2006.01)
    *G06T 7/66*       (2017.01)
    *A63B 24/00*     (2006.01)
    *G06V 40/10*     (2022.01)

(52) U.S. Cl.
    CPC .............. *G06K 9/6215* (2013.01); *G06T 7/20* (2013.01); *G06T 7/55* (2017.01); *G06T 7/66* (2017.01); *G06T 7/70* (2017.01); *G06T 19/006* (2013.01); *G06V 40/10* (2022.01); *H04N 7/147* (2013.01); *A63B 2024/0068* (2013.01); *A63B 2071/0647* (2013.01); *A63B 2220/05* (2013.01); *A63B 2220/806* (2013.01); *A63B 2225/20* (2013.01); *A63B 2230/62* (2013.01); *G06T 2207/10016* (2013.01); *G06T 2207/10028* (2013.01); *G06T 2207/20081* (2013.01); *G06T 2207/30196* (2013.01)

(56) References Cited

U.S. PATENT DOCUMENTS

2018/0160907 A1\*   6/2018   Verma .................... G16H 40/67
2020/0035122 A1    1/2020   Abbott et al.

\* cited by examiner

SYSTEMS AND METHODS FOR ASSESSING BALANCE AND FORM DURING BODY MOVEMENT

CLAIM OF PRIORITY UNDER 35 U.S.C. § 119

This application is a continuation-in-part application of U.S. patent application Ser. No. 16/570,369, filed Sep. 13, 2019, which claims priority to U.S. Provisional Application No. 62/731,744, file Sep. 14, 2018, both entitled "SYSTEMS AND METHODS FOR AUGMENTED REALITY BODY MOVEMENT GUIDANCE AND MEASUREMENT," the contents of each of which are hereby incorporated by reference in their entirety.

INTRODUCTION

The present disclosure generally relates to computer systems and methods for guiding and measuring the positioning of a body using augmented reality.

BACKGROUND

Many activities such as physical therapy, exercise, and sports involve positioning or moving the body in a particular manner. For an individual, it is often difficult to tell whether a position or movement is correct. Usually, a second person such as a therapist, doctor, trainer, or coach provides guidance to the individual. Such professional assistance, however, may be unavailable, untimely, or unaffordable in some cases.

Even if an individual refers to video tutorials for guidance on performing a movement (e.g., an exercise), without an objective assessment of how well the individual is performing the movement, the individual is at risk of injury and ineffective activity (e.g., prolonging rehabilitation or exercise).

Dedicated hardware has been used in film, video games, and professional medical assessment to capture movement. Such hardware, however, may not be available to people needing guidance. Additionally, such dedicated hardware may not be applicable to desired use cases.

In view of the above, it can be appreciated that there are problems, shortcomings or disadvantages associated with current techniques for positioning a body in an effective and safe manner, and that it would be desirable if improved systems to assist individuals with positioning and measuring the body for various activities were available.

SUMMARY

The following presents a simplified summary of one or more aspects of the invention in order to provide a basic understanding of such aspects. This summary is not an extensive overview of all contemplated aspects, and is intended to neither identify key or critical elements of all aspects nor delineate the scope of any or all aspects. Its purpose is to present some concepts of one or more aspects in a simplified form as a prelude to the more detailed description that is presented later.

The disclosure relates to a system for evaluating movement of at least a part of a body of a user. The system may comprise a video display, one or more cameras configured to generate a visual video stream, and a computing device comprising a memory storing computer executable instructions, and a processor configured to execute the computer executable instructions.

In an aspect, the processor may be configured to control the one or more cameras to generate images of at least the part of the body over a period of time, and identify at least the part of the body within the images using a first trained learning machine. The processor may be configured to isolate the identified part of the body from the images, and estimate a position of a plurality of joints of the body by applying a second trained learning machine to the isolated and identified part of the body within the images. The processor may be configured to receive a selection of a tracked pose from a plurality of tracked poses, determine, from the plurality of joints, a set of joints associated with the tracked pose, and generate at least one joint vector connecting joints in the set of joints. The processor may be configured to assign, based on changes in the at least one joint vector over the period of time, a form score to a performance data of the tracked pose, wherein the form score is indicative of a similarity of the performance data captured in the images to a target performance data of the tracked pose stored in a database, and generate, for display on the video display, a user interface that depicts the form score.

In an aspect, the one or more cameras are further configured to generate a depth video stream, and wherein the processor is further configured to control the one or more cameras to generate images of the depth video stream, the depth video stream including a depth image of at least the part of the body.

In an aspect, the processor may be configured to overlay a visual representation of the at least one joint vector over the visual video stream on the video display.

In an aspect, the processor may be configured to overlay the visual representation in real time as the one or more cameras generate the images of the visual video stream.

In an aspect, the processor may be configured to determine, from the plurality of joints, the set of joints associated with the tracked pose by referring to a data structure that maps each tracked pose in the plurality of tracked poses to a respective set of joints used to assess a respective performance.

In an aspect, the processor may be configured to generate the at least one joint vector connecting joints in the set of joints by referring to the data structure, wherein the data structure further indicates how the respective set of joints are connected.

In an aspect, the processor may be configured to assign the form score to the performance of the tracked pose by determining changes in joint vectors associated with the target performance, comparing the changes in the joint vectors associated with the target performance with the changes in the at least one joint vector over the period of time, and determining the form score based on the comparison between the respective changes.

In an aspect, the form score is a function of a reward criterion and a penalty criterion and the processor may be configured to determine the form score based on the comparison by determining the reward criterion comprising positive factors for achieving partial or full range of motion for the tracked pose, determining the penalty criterion comprising negative factors based on extraneous movements or unwanted range of motion the tracked pose, and calculating the form score based on the reward criterion and the penalty criterion.

In an aspect, the processor may be configured to determine whether the form score is less than a threshold form score, and in response to determining that the form score is less than the threshold form score, overlay, on the visual video stream, a visual representation of the tracked pose for guidance.

In an aspect, the processor may be configured to track an amount of repetitions for the tracked pose over the period of time, wherein the form score is recalculated for each repetition.

In another aspect, the disclosure provides a method for evaluating movement of at least a part of a body of a user. The method may comprise controlling one or more cameras to generate images of at least the part of the body over a period of time. The method may comprise identifying at least the part of the body within the images using a first trained learning machine, and isolating the identified part of the body from the images. The method may comprise estimating a position of a plurality of joints of the body by applying a second trained learning machine to the isolated and identified part of the body within the images and receiving a selection of a tracked pose from a plurality of tracked poses. The method may comprise determining, from the plurality of joints, a set of joints associated with the tracked pose, and generating at least one joint vector connecting joints in the set of joints. The method may comprise assigning, based on changes in the at least one joint vector over the period of time, a form score to a performance of the tracked pose, wherein the form score is indicative of a similarity of the performance captured in the images to a target performance of the tracked pose. The method may comprise generating, for display on the video display, a user interface that depicts the form score.

The disclosure further relates to a system for evaluating physical balance of a user. The system may comprise a video display, one or more cameras configured to generate a visual video stream, and a computing device comprising a memory storing computer executable instructions, and a processor configured to execute the computer executable instructions.

In an aspect, the processor may be configured to control the one or more cameras to generate images of at least the part of the body over a period of time. The processor may be configured to control identify at least the part of the body within the images using a first trained learning machine. The processor may be configured to isolate the identified part of the body from the images. The processor may be configured to estimate a position of a plurality of joints of the body by applying a second trained learning machine to the isolated and identified part of the body within the images. The processor may be configured to determine a center of mass of the user based on the position of the plurality of joints. The processor may be configured to calculate a first balance threshold for the user based on dimensions of each foot of the user. The processor may be configured to monitor changes in the center of mass as the user performs movements. The processor may be configured to calculate a balance score based on the changes in the center of mass, wherein the balance score is indicative of deviations of the center of mass from the first balance threshold, and generate, for display on the video display, a user interface that depicts the balance score.

In an aspect, the processor may be configured to calculate the balance score by determining a first amount of times that the center of mass was calculated over the period of time, determining a second amount of times that the center of mass exceeded the first balance threshold, and calculating a ratio between the second amount and the first amount, wherein the ratio is the balance score.

In an aspect, the first balance threshold is a predetermined value indicative of ideal balance, and wherein the processor is further configured to determine a second balance threshold indicative of a limit at which balance is lost.

In an aspect, the processor may be configured to determine the second balance threshold by determining a length of each foot of the user, a distance between each foot, and a width of each foot, generating, on the user interface, a visual representation of each foot and the distance, and generating, on the user interface, a boundary around the visual representation, wherein the boundary is the second balance threshold, wherein the balance score is indicative of deviations of the center of mass from the first balance threshold and the second balance threshold.

In an aspect, the processor may be configured to calculate the balance score based on both the deviations of the center of mass from the first balance threshold and a proximity of the center of mass to the second balance threshold.

In an aspect, the processor may be configured to calculate the balance score by determining differences between the center of mass and points on the second balance threshold over the period of time, and calculating the balance score based on a magnitude of the differences.

In an aspect, the processor may be configured to determine whether the balance score is less than a threshold balance score, and in response to determining that the balance score is less than a threshold balance score, generate an alert on the user interface. In an aspect, the alert indicates instructions for regaining balance.

In another aspect, the disclosure provides a method for evaluating physical balance of a user. The method may comprise controlling one or more cameras to generate images of at least the part of the body over a period of time. The method may comprise identifying at least the part of the body within the images using a first trained learning machine. The method may comprise isolating the identified part of the body from the images. The method may comprise estimating a position of a plurality of joints of the body by applying a second trained learning machine to the isolated and identified part of the body within the images. The method may comprise determining a center of mass of the user based on the position of the plurality of joints. The method may comprise calculating a first balance threshold for the user based on dimensions of each foot of the user. The method may comprise monitoring changes in the center of mass as the user performs movements. The method may comprise calculating a balance score based on the changes in the center of mass, wherein the balance score is indicative of deviations of the center of mass from the first balance threshold. The method may comprise generating, for display on the video display, a user interface that depicts the balance score.

These and other aspects of the invention will become more fully understood upon a review of the detailed description, which follows.

DETAILED DESCRIPTION

Figure 1:
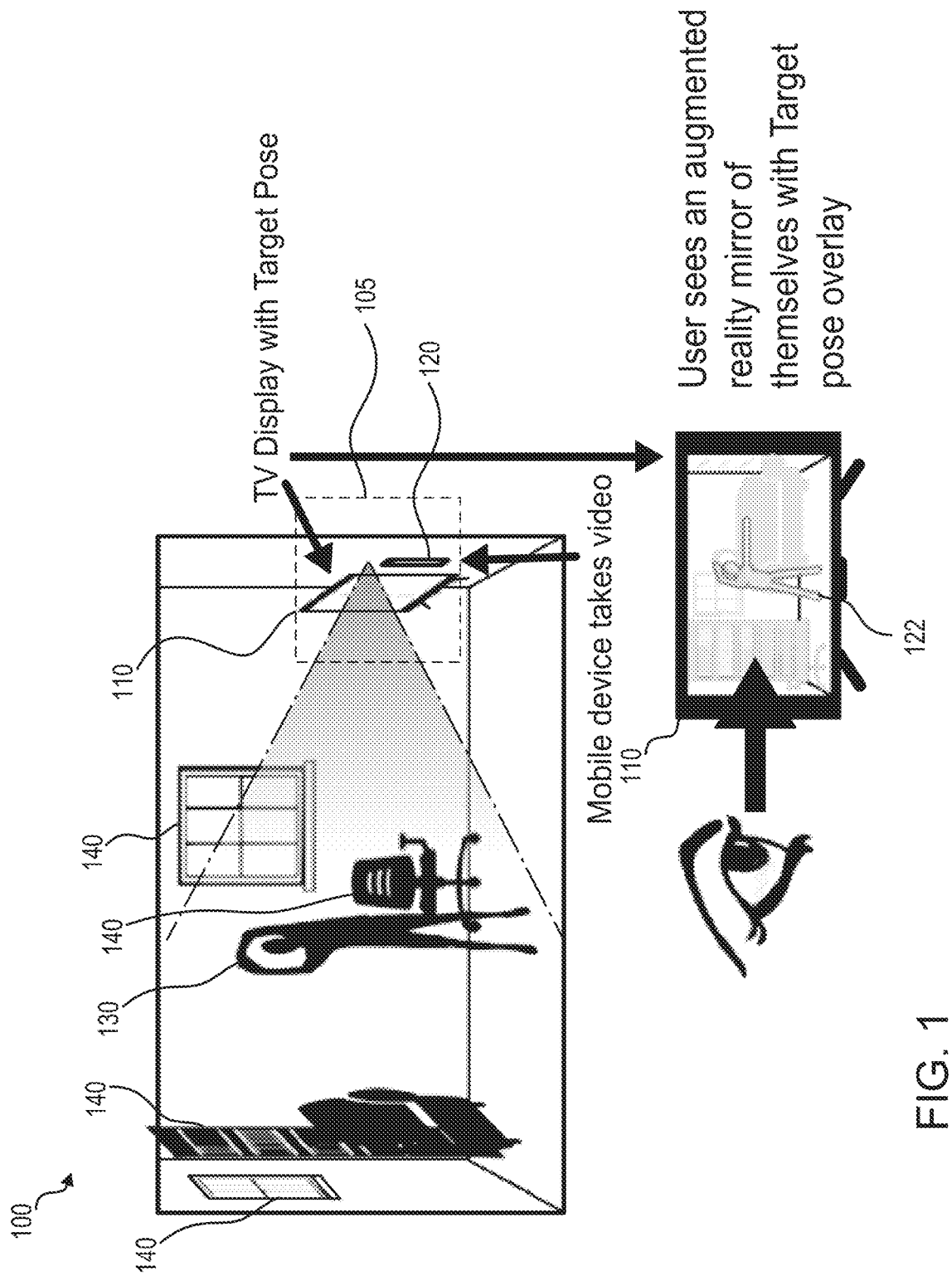
FIG. 1 is schematic diagram showing an example environment of an example augmented reality body guidance system, according to an aspect of the disclosure.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known components are shown in block diagram form in order to avoid obscuring such concepts.

This written description uses examples to disclose the invention, including the preferred embodiments, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims. Aspects from the various embodiments described, as well as other known equivalents for each such aspect, can be mixed and matched by one of ordinary skill in the art to construct additional embodiments and techniques in accordance with principles of this application.

Current techniques for positioning a body and recording the position typically involve either a trained professional or dedicated hardware. Trained professionals may be expensive and/or require a person to accommodate the schedule of the trained professional. Further, even with training, a human may be limited in the amount of information that can be observed, collected, and recorded. The trained professional may insert a subjective perspective into observations, which may cloud the judgment of others who view a record. Dedicated hardware for positioning a body or recording body positions may not be available or convenient for many use cases. For example, a motion capture suit may be used in film to capture movements of an actor for realistic computer generated imagery. It may be unrealistic, however, for a physical therapy patient to don a motion capture suit for performing daily exercise. Body worn sensors may capture body movement information, but are typically limited to movement of a single body part and rely on assumptions to estimate general movement.

The present disclosure provides for an augmented reality body guidance system that provides a user with a video display for positioning the body of the user, or a part thereof. The augmented reality body guidance system may include a video display and a computing device. The computing device may include or be connected to one or more cameras. The computing device may generate a visual image of the body and a depth image of the body using the cameras. The computing device may use a first trained learning machine to identify the body of the user from a background of the images. As used herein, the term "trained learning machine" refers to a computer model based on sample data that may be executed by a computer processor to perform a task. The computing device may isolate the identified body from the rest of the images by using techniques such as cropping. The computing device may use a second trained learning machine to estimate joint positions of the identified, isolated body. In an aspect, the estimated joint positions may be in 3-dimensional (3D) space. The computing device may generate an estimated body pose and overlay the estimated body pose on an image (e.g., the visual image) for the user to view. The augmented reality body guidance system may also display a target pose and/or a difference from the target pose. Additionally, the augmented reality body guidance system may track performance of the user with respect to the estimated body pose matching the target pose. For example, the augmented reality body guidance system may determine measurements of the body of the user and store or transmit the measurements.

The augmented reality body guidance system may be used for various scenarios that require specific positioning of the body. For example, a first use case is physical therapy or rehabilitation. The augmented reality body guidance system may provide a user with guidance through one or more rehabilitation exercises, which may be conducted at home. The augmented reality body guidance system may reduce the frequency of need to meet with a medical care provider or physical therapist. In a second use case, the augmented reality body guidance system may guide the user through a correct exercise form. The augmented reality body guidance system may be programed with a series of poses for completing an exercise routine. Additional use cases include telemedicine (e.g., for diagnosis), medical research (e.g., gait analysis, prosthetic performance), disease progression monitoring, sports instruction, military training, interactive video games, motion capture studio, and remote shopping (e.g., virtual fitting room).

FIG. 1 is schematic diagram showing an example environment 100 of an example augmented reality body guidance system 105, according to an aspect of the disclosure. The environment 100 may include the augmented reality body guidance system 105, a user 130, and optionally one or more other objects 140. Generally, the environment 100 may be any location providing space for the user 130 to move and view a video display 110. In an aspect, the user 130 may not be required to wear any sensors and may be dressed comfortably in a convenient location such as the home of the user 130. The augmented reality body guidance system 105 may include a video display 110 and a computing device 120. In an aspect, the computing device 120 may be positioned near the video display 110 and facing substantially the same direction. Although the computing device 120 may be separated from the video display 110 and turned to face the user 130, close positioning of the computing device 120 to the video display 110 may allow the user to focus attention on the video display. In other scenarios, for example, use cases focusing on movement of specific body parts, the computing device 120 may be moved to focus on the specific body part while the user 130 views the video display 110.

The video display 110 may be a video display capable of receiving input from the computing device 120. For example, the video display 110 may be a television or computer monitor. In an aspect, the video display 110 may receive a wireless video input signal (e.g., wireless HDMI) from the computing device 120. In another aspect, a compatible wired connection may be used between the computing device 120 and video display 110. In an aspect, a video display of the computing device 120 may be used as the video display 110 or may act as a second video display presenting either a copy of the video display 110 or a user interface for controlling the video display 110. In an aspect, the video display 110 may display a target pose 122. The target pose 122 may represent a pose that the user 130 should emulate by moving his/her body.

The computing device 120 may be a computer such as a desktop computer, laptop computer, or mobile device. The computing device may include a processor, a memory, and 3-dimensional (3D) imaging capabilities. For example, the computing device 120 may include or be connected to at least one camera such as a digital color video camera (e.g., RGB) and/or depth camera. The depth camera may be, for example, an infrared camera or a stereoscopic camera. In an aspect, several mobile phones such as the iPhone X are currently available that include 3D imaging capabilities. The computing device 120 may generate a visual image and a depth image of a scene including the user 130. A visual image may include a plurality of pixels, each pixel defining a visual property (e.g., color, intensity, and, opacity). A depth image may similarly include a plurality of pixels, but each pixel may define a depth from the camera to a nearest object. A visual video stream may include a plurality of sequential visual images. A depth video stream may include a plurality of sequential depth images. The scene may also include the objects 140, which may include, for example, chairs, doors, bookshelves, decorations, windows, or other objects that may be present in the environment 100. As discussed in further detail below, the computing device 120 may utilize a first trained learning machine to isolate the body of the user 130 from a background of the image including the objects 140. Isolation of the user 130 may allow the system 105 to be used at any location. Further, the user may move within a field of view of the camera. When the user is partially obscured or out of the field of view, the system 105 may analyze those portions of the body of the user 130 that are visible.

Figure 2:
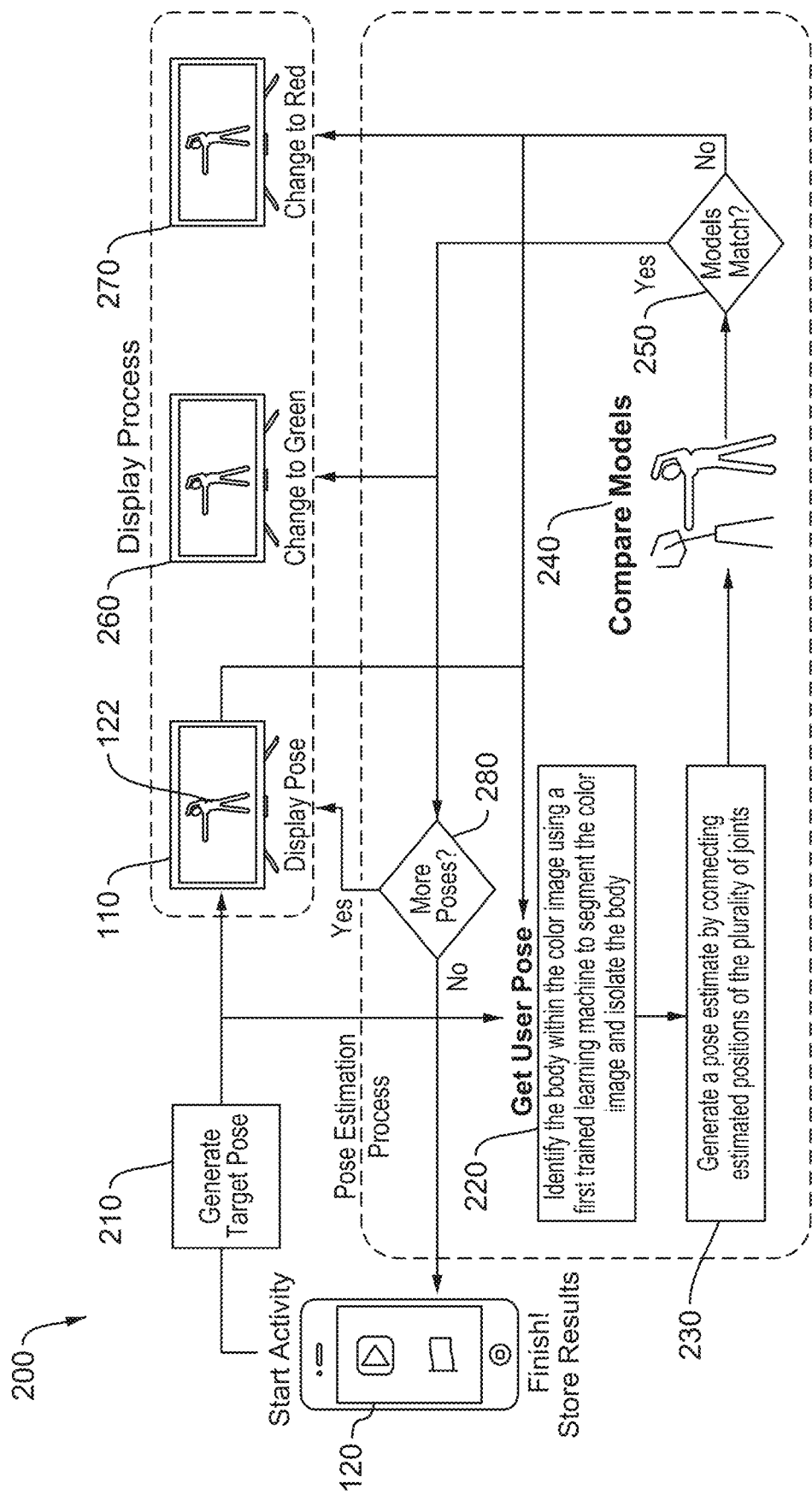
FIG. 2 is a flow diagram of an example method of guiding a body into a target pose, according to an aspect of the disclosure.

FIG. 2 is a flow diagram of an example method 200 of guiding a body into a target pose 122, according to an aspect of the disclosure. The method 200 may be performed by the augmented reality body guidance system 105. More specifically, the computing device 120 may perform a pose estimation process and control a display process performed by the video display 110. The computing device 120 may be programmed to perform the method 200 with computer-executable instructions (e.g., an application) stored in a computer-readable medium (e.g., a computer memory). The application may be modular and may be able to load modules for different use cases. For example, a module may include one or more poses or segments thereof. Accordingly, a specialist may provide modules for specific use cases, which may be customized to a user 130, within the framework of the application. For instance, modules may be loaded when the application is installed, or downloaded from external sources available to a specialist or the user 130. In the example of a physical therapy scenario, a healthcare provider may publish a library of physical therapy exercises that will be standard among multiple patients. If a doctor prescribes a subset of the exercises, the specialist or user 130 may download this library and the specialist may configure the modules to create a specific exercise routines customized to the user 130.

At block 210, the computing device 120 may generate a visual representation of a target pose 122. The target pose 122 may be stored in a memory of the computing device 120, for example, as a set of joint positions. The target pose 122 may be a model of a desired position of the body of the user 130. The computing device 120 may generate the visual representation by mapping the joint positions into a 3D space at a location of the user 130. The target pose 122 may be user-fixed or world-fixed. If the target pose 122 is world-fixed, then the user 130 may be instructed to position their body so that it meets the position and scale of the target pose 122, as shown on the video display 110. World-fixed target poses 122 may be used as the initial pose in a series so that the user is positioned in such a manner that all subsequent poses in the series may be captured by the camera. If the pose is user-fixed, then the device 120 takes the information in an image to scale and position the target pose 122 so that the target pose 122 fits the current size and position of the user 130. User-fixed target poses 122 may be used for determining the user's joint positions without requiring the user 130 to be in a specific position, so that the user 130 may focus on their pose. When the target pose 122 is user-fixed, the device 120 may delay the presentation of the target pose 122 until after the device 120 has calculated a current use pose. In an aspect, the target pose 122 may include an outline, which may visually represent a permissible deviation from the joint positions. The computing device 120 may output the visual representation of the target pose 122 to the video display 110, for example, as an overlay over a current input image from the color camera of the computing device 120.

At block 220, the computing device 120 may identify the body within the images using a first trained learning machine to segment the images and isolate the body. In an aspect, the first trained learning machine may be applied to the visual image, which may be a color image. The first trained learning machine may generate a segment including the body. The computing device 120 may isolate the identified body by techniques such as cropping both the visual image and the depth image based on the identified body.

At block 230, the computing device 120 may estimate a position of a plurality of joints of the body by applying a second trained learning machine to the isolated body in the depth and color images. For example, the second trained learning machine may output a series of estimated 3D coordinates of joints from 2D pixel locations. In an implementation, the estimated 3D coordinates may be in the form of a feature vector or heatmap. A feature vector may directly give an estimate of the coordinate for the given joints. A heatmap may give a probability for each location in space that the joint may occupy. The heatmap may then be used to choose the location with the highest probability as an estimate for the coordinate of a given joint.

The system 105 may also impose limitations on the positions of joints that relate to human anatomy. As an example, the human elbow does not typically hyperextend to over 270 degrees. Therefore, the system 105 may limit the range of acceptable positions for the shoulder, wrist, and elbow joints to accommodate this physiological limitation.

The computing device 120 may generate a pose estimate by connecting the estimated positions of the plurality of joints. The pose estimate may be a model of a current position of the body of the user or parts thereof (e.g., only a leg). The pose estimate may include 3D coordinates for the estimated position of each joint. In an aspect, the second trained learning machine may output two-dimensional (2D) coordinates of estimated position of each joint. The computing device 120 may use the depth image to determine the 3D coordinates of each joint.

In an aspect, the computing device 120 may overlay a visual representation of the current pose estimate over the visual video stream on the video display 110. For example, the estimated pose may be visually represented as lines connecting the estimated positions of the plurality of joints. Accordingly, both the estimated pose and the target pose 122 may be presented on the video display 110. The visual representation of the current pose estimate may be presented in real time as the video streams are generated by the camera. There may be a small processing delay of the first and second trained learning machines, but the delay may be kept within limits that allow the user 130 to respond to the displayed visual representation of the current pose and adjust a position of their body. A time between display of an image of the video stream and display of the current pose based on the image may be less than 0.5 second, preferably less than 0.3 second, and more preferably less than 0.1 second. The delay may be based on processing power of the computing device 120.

At block 240, the computing device 120 may compare models of the position of the body of the user. For example, the computing device 120 may compare the estimated pose with the target pose 122. In an aspect, the comparing may include determining whether the estimated pose falls within a tolerance of the target pose 122. In another aspect, the comparing may include determining a difference between the estimated pose and the target pose, such as a difference in an angle of a joint. The comparison may be performed using the Euclidian distance between each joint of the estimated pose and target pose 122. The comparison may be determined as a summed whole, or joint-by-joint. If it is joint-by-joint, then the system 105 may display specific feedback such as an arrow on each joint to better indicate to the user how to fit into the target pose.

The system 105 may also apply weights to certain joints that are more or less important to the target pose 122 when performing the comparison. For example, when performing bicep curls, the positions of the user's wrists, elbows, and shoulders are more important and may be weighted heavier than the position of their hips, knees, and ankles. In this manner, the weight applied to joints that are not relevant to the exercise may be 0, removing that particular joint from the requirements and success criteria of the target pose 122.

At block 250, the computing device 120 may determine whether the models match. For example, the computing device 120 may determine that the estimated pose falls within the tolerance of the target pose 122 or determine that the difference between the estimated pose and the target pose is less than a threshold.

In response to the models matching, at block 260, the computing device 120 may indicate a successful match. For example, the computing device 120 may change the displayed color of the target pose. For instance, the color of the target pose 122 may change from blue to green. The method 200 may also proceed to block 280 in response to the models matching.

In response to the models not matching, at block 270, the computing device 120 may indicate that the models do not match. For example, the computing device 120 may change the displayed color of the target pose. For instance, the color of the target pose 122 may change from blue to red. In an aspect, the method 200 may return to block 220 in response to the models not matching. That is, the computing device 120 may repeatedly estimate the current pose of the user and compare the current pose to the target pose 122 until the current pose matches the target pose 122. A timer or other limit may be used to escape the loop when no match occurs.

At block 280, the computing device 120 may determine whether at least one more target pose 122 is available. For example, a physical therapy system may include a series of poses for the user 130 to attempt. If an additional pose is available, the method 200 may return to block 210, where the additional target pose 122 is generated and displayed. If no additional pose is available, the method 200 may store results related to the poses.

Figure 3:
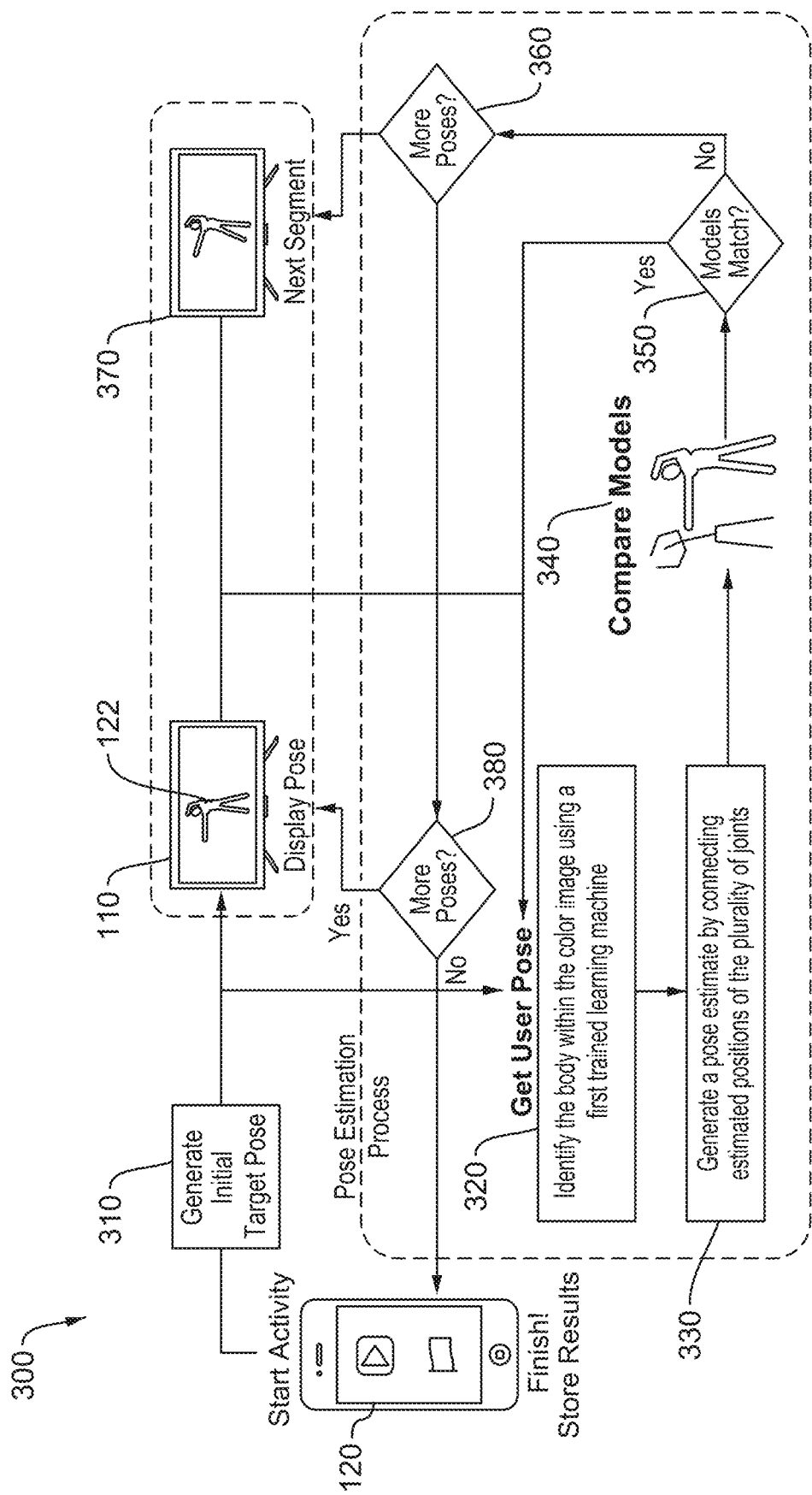
FIG. 3 is a flow diagram of an example method of guiding a body through a series of poses, according to an aspect of the disclosure.

FIG. 3 is a flow diagram of an example method 300 of guiding a body through a series of poses, according to an aspect of the disclosure. The method 300 may be similar to the method 200 in some aspects, but may be adapted to poses including a series of segments. The series of segments may represent movement of the body from an initial pose. The method 300 may be performed by the augmented reality body guidance system 105. More specifically, the computing device 120 may perform a pose estimation process and control a display process performed by the video display 110.

Poses may be tracked or untracked. A segment is a set of joint positions that also include a time component. An untracked pose contains a single set of joint positions which is the final position the user 130 should be in for that target pose. When a user 130 executes an untracked pose, the user 130 may take any time and any method to reach the target position. In this manner, when a user 130 executes an untracked pose they may stop, stretch, walk out of the scene, etc. as long as the user 130 eventually makes the target pose 122. A good example of untracked poses would be casual Yoga, where the user 130 is given freedom to form each pose in the manner that is most comfortable to them.

A tracked pose contains a series of sets of joint positions, each set being called a segment, which typically include timing requirements. In an aspect, in order to successfully fit the pose, the user must fit all the given segments in starting the pose, optionally fitting them in given time frames. Tolerances may be used to allow various amounts of deviation. For example, in some cases, a limited number of segments may be missed, or a pose may be missed by a certain degree of difference. In this manner, when a user executes a tracked pose the user 130 should remain focused and in position. If the user 130 deviates too much from any of the target poses 122 within the set, the user 130 may be asked to start over. A tracked pose may be used for an exercise such as squats, for example. In order to execute a good squat, the user should be in proper form when they stand, when they descend, when they squat, and when they ascend. The system 105 may compare the current pose to the target pose 122 for each of the positions, as well as measure the time between the poses. In an aspect, the computing device 120 may generate a form score that serves as an objective evaluation of how close the user's pose is to the target pose. This is further described in the description of FIG. 13.

At block 310, the computing device 120 may generate a visual representation of an initial target pose associated with a series of segments. The target pose and a segment including a series of poses may be stored in a memory of the computing device 120, for example, as a sequence of sets of joint positions, or a sequence of changes from an initial set of joint positions, and timing components associated with one or more of the poses and segments. Each pose in a segment may be considered a target pose 122 and may be a model of a desired position of the body of the user 130. The computing device 120 may generate the visual representation by mapping the joint positions into a 3D space at a location of the user 130. In an aspect, the target pose 122 may include an outline, which may visually represent a permissible deviation from the joint positions. The computing device 120 may output the visual representation of the target pose 122 to the video display 110, for example, as an overlay over a current input image from the color camera of the computing device 120.

At block 320, the computing device 120 may identify the body or a part thereof within the visual image using a first trained learning machine in a similar manner to block 220. For example, the first trained learning machine may be configured to segment the visual image and isolate the body. The first trained learning machine may generate a segment of the image including the body. The computing device 120 may isolate the body or part thereof from a background of the image. For example, the computing device 120 may crop both the visual image and the depth image based on the segment of the image including the identified body parts.

At block 330, the computing device 120 may estimate a position of a plurality of joints of the body by applying a second trained learning machine in a similar manner as block 230. For example, the second trained learning machine may be applied to the isolated body of part thereof. The second trained learning machine may output a series of estimated 2D or 3D coordinates of joints. The computing device 120 may determine 3D coordinates based on the depth image. Similar to the method 200, the computing device 120 may generate a pose estimate by connecting the estimated positions of the plurality of joints. The pose estimate may be a model of a current position of the body of the user. In an aspect, the computing device 120 may overlay a visual representation of the current pose estimate over the color video stream on the video display 110. For example, the estimated pose may be visually represented as lines connecting the estimated positions of the plurality of joints. Accordingly, both the estimated pose and the target pose 122 may be presented on the video display 110.

At block 340, the computing device 120 may compare models of the position of the body of the user. For example, the computing device 120 may compare the estimated pose with the target pose 122. In an aspect, the comparing may include determining whether the estimated pose falls within a tolerance of the target pose 122. In another aspect, the comparing may include determining a difference between the estimated pose and the target pose, such as a difference in an angle of a joint. When the target pose 122 is associated with a timing component, the computing device 120 may also determine whether the timing of the current pose matches the timing component of the target pose 122. Once again, a tolerance may be used to determine whether the user 130 has satisfied the timing component.

At block 350, the computing device 120 may determine whether the models match. For example, the computing device 120 may determine that the estimated pose falls within the tolerance of the target pose 122 or determine that the difference between the estimated pose and the target pose is less than a threshold. A match may also include the time of the current pose satisfying the timing component of the target pose 122.

In response to the models matching, at block 360, the computing device 120 may determine whether the series of target segments includes additional segments. If the series of target segments includes at least one additional segment, at block 370, the computing device 120 may display the next segment on the video display 110. If there are no additional segments in the series of target segments, at block 380, the computing device 120 may determine whether at least one more target pose 122 is available. If an additional pose is available, the method 300 may return to block 310, where the additional target pose 122 is generated and displayed. If no additional pose is available, the method 300 may include storing results related to the poses.

The results may include a record of whether the user 130 met each target pose 122. Additionally, the results may include measurements of deviations from target poses 122 (e.g., an angle from the correct position), or measurements of individual joints when attempting particular target poses 122 (e.g., an angle of a joint, or angle from horizontal or vertical). The measurements may be objective measurements from the perspective of the system 105. For example, a minimum or maximum angle of a joint during an exercise may be measured and recorded. In some scenarios, the measurements may include a number of repetitions of an exercise or target pose 122.

The results may be stored individually or in aggregate, such that the user's performance may be reported to a specialist (such as physical therapist or personal trainer) for further evaluation. The user may also review their own performance, so that they can track their own fitness and health themselves. For example, performance tracking may be used for the physical therapy use case, as the system 105 can store performance measurements and report on whether the user 130 conformed to the prescribed physical therapy. For example, the system 105 may indicate how often the user performed the exercises, and how well the user performed the exercises.

In addition, the system 105 may record self-reported data, from the user 130, which may include subjective measurements such as pain, fatigue, energy, sleep, state of mind, etc. that may be useful for the specialist or individual reviewing their performance. The system 105 may collect such data via the video display 110 and/or mobile device 120. For instance, the video display 110 and/or mobile device 120 may include a microphone, keypad, or touch interface. In an aspect, the video display 110 and/or mobile device 120 may execute software to provide a conversational artificial intelligence based voice assistant. For example, the voice assistant may ask questions before, during, or after the user 130 is attempting a pose. For example, the voice assistant may ask whether the user 130 is experiencing pain during the movement. The voice assistant may also provide instructions or feedback in addition to the visually indicated feedback. For example, the instruct the user 130 to move a particular body part in a direction based on a determined difference from the target pose. The video display 110 and/or mobile device 120 may also provide audio or haptic feedback. In an aspect, additional monitoring devices such as heart rate monitors may be connected to the system to record additional measurements.

In an aspect, the system 105 may also give direct feedback to the user 130 about their performance other than accuracy. The mobile device may review the stored data and give feedback such as "your performance this week is higher than last week" or other such common-language terms. In an aspect, the system 105 may not give medical advice or diagnostic information. Instead, the system 105 may provide information to a specialist who has prescribed or recommended the use of the system 105 for physical therapy.

Figure 4A:
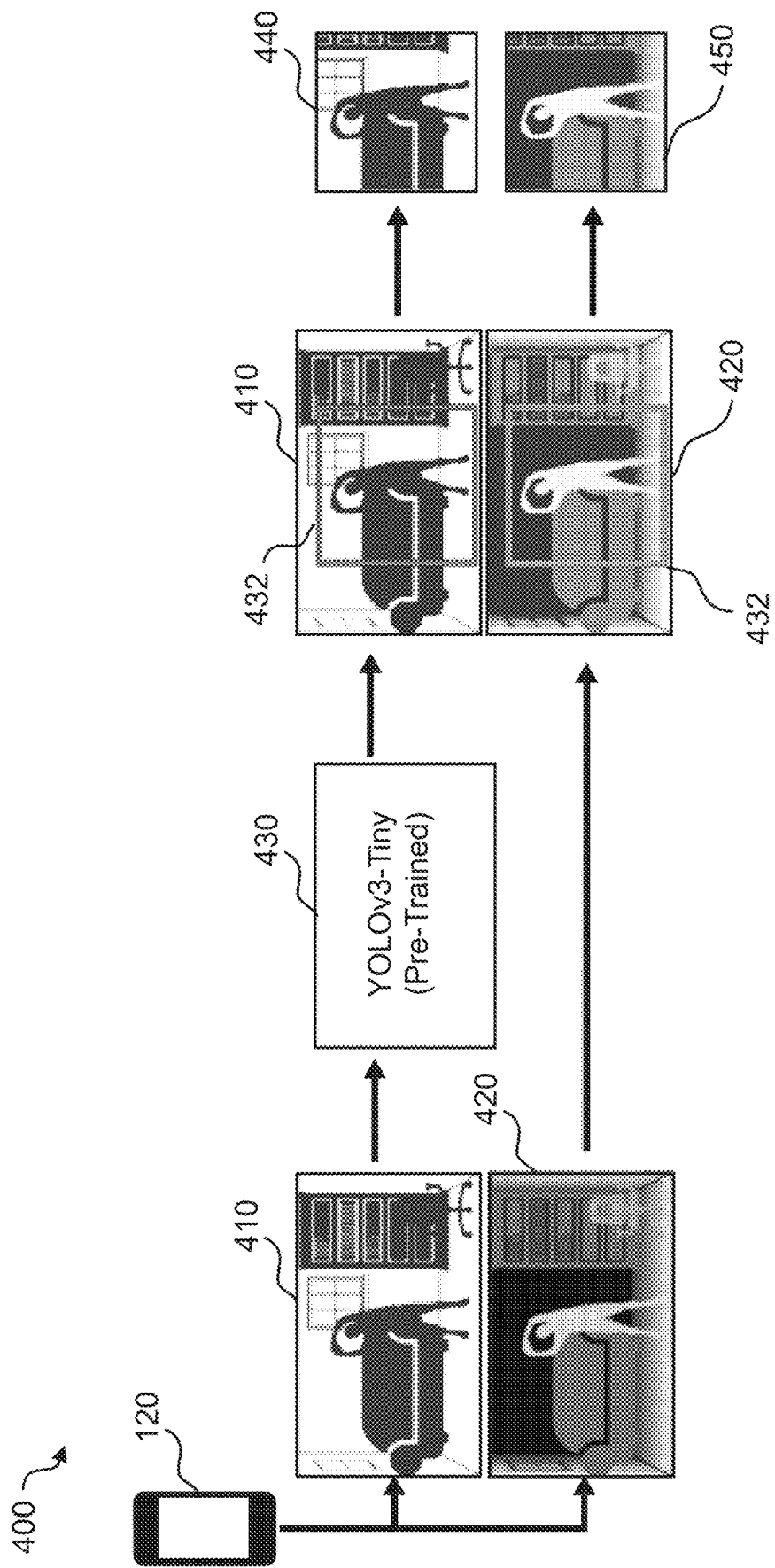
FIGS. 4A and 4B are schematic diagrams of an example method of determining body pose based on video inputs, according to an aspect of the disclosure.
Figure 4B:
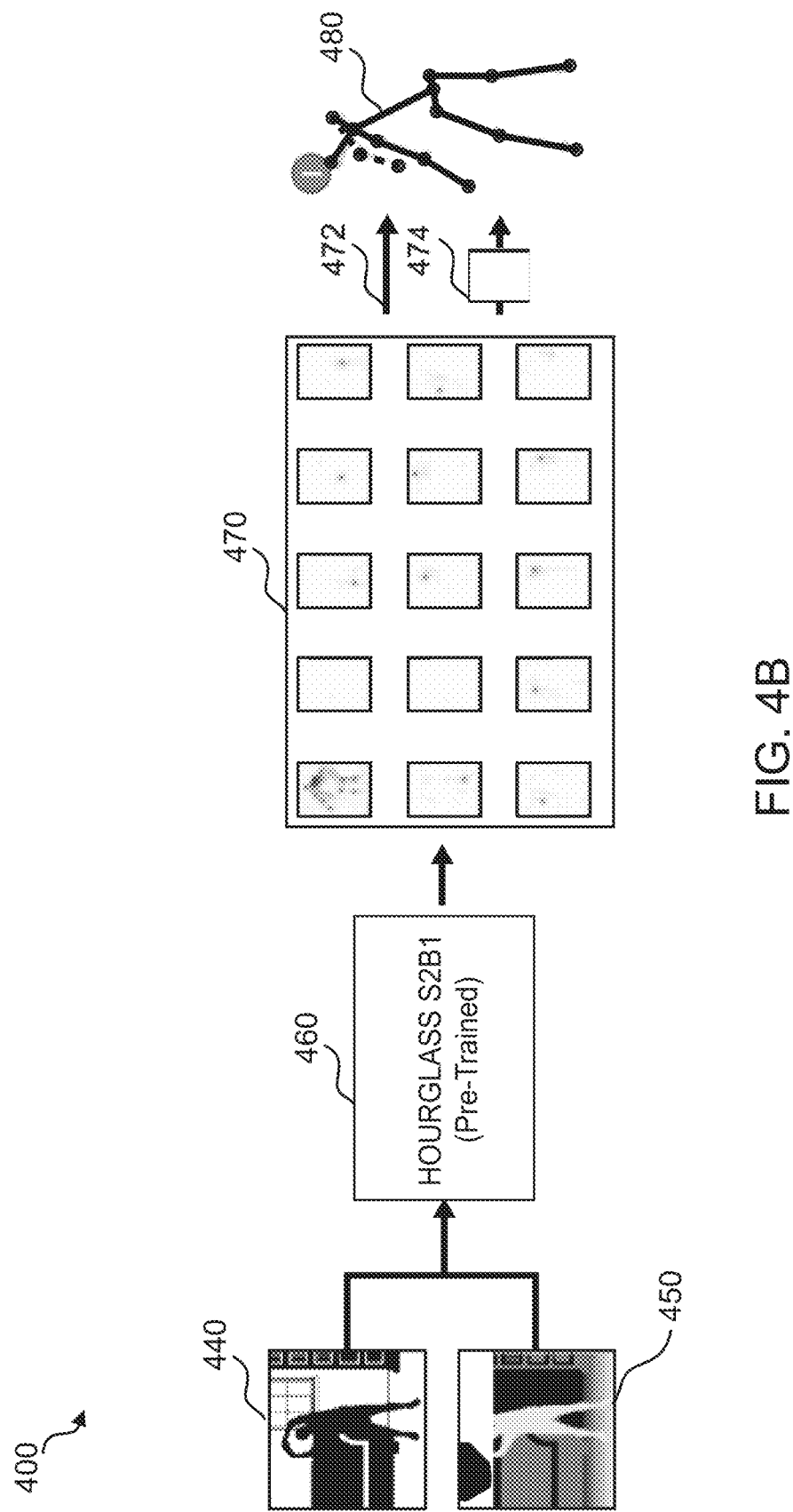

FIGS. 4A and 4B are schematic diagrams of an example method 400 of determining body pose based on video inputs, according to an aspect of the disclosure. More specifically, FIG. 4A provides an example of blocks 220 and 320 and FIG. 4B provides an example of blocks 230 and 330. The method 400 may be performed by the computing device 120. The computing device 120 may generate a color image 410 and a depth image 420 of the environment 100 including the user 130. The color image 410 may include a set of pixels. Each pixel may have one or more color values. For example, the color may be represented as red, green, and blue (RGB) color values. The color image 410 may be an example of a visual image. It should be appreciated that other visual images such as greyscale images may be used in a similar manner. The depth image 420 may be an image of the same environment 100 as the color image 410. The depth image 420 may also include a set of pixels, which may correspond to the pixels of the color image 410. Each pixel of the depth image 420 may be associated with a depth value representing a distance from the camera to a closest object. For example, as illustrated, lighter shaded portions of the depth image 420 are closer to the camera than darker shaded portions. In an aspect, the color image 410 and depth image 420 may be combined into a single set of pixels with both color (or greyscale) values and depth values. Additionally, it should be appreciated that depth values may use either a positive or negative scale (e.g., reverse-z) to indicate a distance from the camera.

A first trained learning machine 430 may receive the color image 410 and produce an image segment 432 including the body of the user 130. The first trained learning machine 430 may be an object detection learning machine, e.g., any type of object detection algorithm for detecting an object in an image and creating a bounding box around the detected object. For example, in on example implementation, the first trained learning machine 430 may be a you-only-look-once (YOLO) real-time object detection system. In another aspect, a real-time object detection system may segment the image quickly enough (e.g., approximately 30 ms) such that the segmentation may be used to update the pose estimate at a display frame rate (e.g., 30 frames per second). The first trained learning machine 430 may be, for example, a neural network that is applied to the color image 410. For example, a YOLOv3 system may be a 106 layer fully convolutional neural network. The neural network may be trained to identify images of a human body as an object detector. In an aspect, the first trained learning machine 430 may be trained specifically on images of the user 130. The first trained learning machine 430 may output an image segment 432 (e.g., shown as a bounding box around the object) that includes the detected human body as a location and size of the image segment 432.

The computing device 120 may crop both the color image 410 and the depth image 420 using the image segment 432 to generate a cropped color image 440 and a cropped depth image 450, respectively.

A second trained learning machine 460 may receive the cropped color image 440 and the cropped depth image 450 as input. The second trained learning machine may estimate the locations of joints in the body of the user 130 and be configured as a joint detector or more generally as a key point detector of key points in the detected object within the bounding box. In one example, the second trained learning machine 460 may be a deep convolutional network referred to as a stacked hourglass neural network or hourglass model, although the exemplary embodiment is not so limited to this model. Moreover, the second trained learning machine 460 may pre-trained on an extensive corpus of labeled data (e.g., photographs of bodies with body parts and joints labeled). In an exemplary aspect, the second trained learning machine 460 may perform a multi-classification on each pixel in a video frame to determine to which human joint the pixel belongs. For example, the multi-classification may determine a probability for each of 17 human joints and select the most likely joint. The second trained learning machine 460 may generate joint predictions 470 (e.g., heatmaps) that each locate a specific joint. The computing device 120 may generate the pose estimate 480 by connecting the locations given by the joint predictions 470. In an aspect, the pose estimate 480 generated by the second trained learning machine 460 may include two dimensional locations for each joint.

The computing device 120 may generate a three dimensional model of the body including a set of joint angles using the depth image 420 and/or cropped depth image 450. The pose estimate 480 may be overlaid on the depth image 420 and/or cropped depth image 450. A Z-coordinate corresponding to each joint may be estimated based on the depth value of the corresponding pixel of the depth image 420 and/or cropped depth image 450. For example, in an operation 472, the computing device 120 may integrate pixel coordinates (x,y) and depth (z) distances and redefine these three quantities in a common unit of length. Moreover, in one exemplary aspect, the computing device 120 may then perform inverse kinematic calculations on the resulting set of 3D coordinates to determine biologically feasible positions in order to obtain the set of joint angles. The 3D model may be generated using the pose estimate 480, depth values, set of joint angles, and measurements (e.g., arm length) or assumptions (e.g., equal arm lengths) about the body of the user 130. In another aspect, the computer device 120 may employ a third trained learning machine 174 to generate the three dimensional model of the body. The third trained learning machine 174 may directly map the 2D joint data (e.g., x, y coordinates) and depth distances to the set of joint angles. For instance, the third trained learning machine 174 may be trained on 3D models generated using the inverse kinematic calculations, for example, which may be manually reviewed. The third trained learning machine 174 may be relatively light weight and may be less computationally intensive than an explicit streaming calculation of the joint angles using algebraic and/or iterative inverse kinematics in various exemplary aspects. Accordingly, use of a third trained learning machine 174 may allow a higher frame rate for the 3D model.

Figure 5:
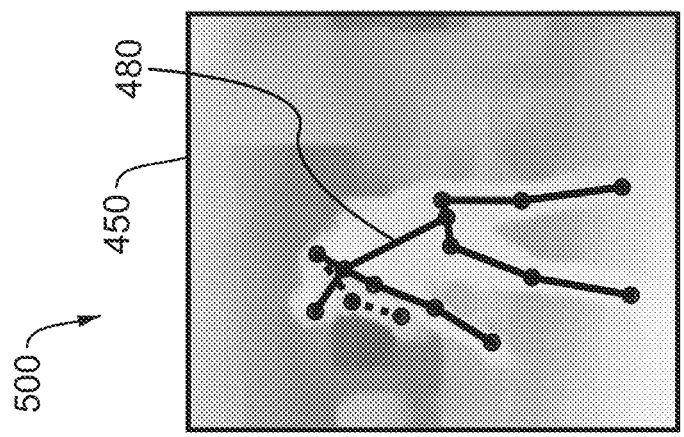
FIG. 5 is an example output display including a representation of a pose estimate and a video image, according to an aspect of the disclosure.

FIG. 5 is an example output display 500 including a representation of a pose estimate 480 and a video image, according to an aspect of the disclosure. The video image illustrated may be the cropped depth image 450, but the pose estimate 480 may be displayed overlaying other images such as the color image 410, depth image 420, or cropped color image 440. As illustrated, the pose estimate 480 may include circular points showing the location of joints and connecting lines representing the torso and limbs. In some embodiments, the lines may be expanded to diamond shapes indicating a width of a limb. In an aspect, parts of the pose estimate 480 may be obscured by other parts of the body and the corresponding estimates may be less reliable. The pose estimate 480 may provide an indication of reliability using color, line weight, or line patterns. For example, as illustrated, the partially obscured right arm of the pose estimate 480 is shown with dashed lines.

Figure 6:
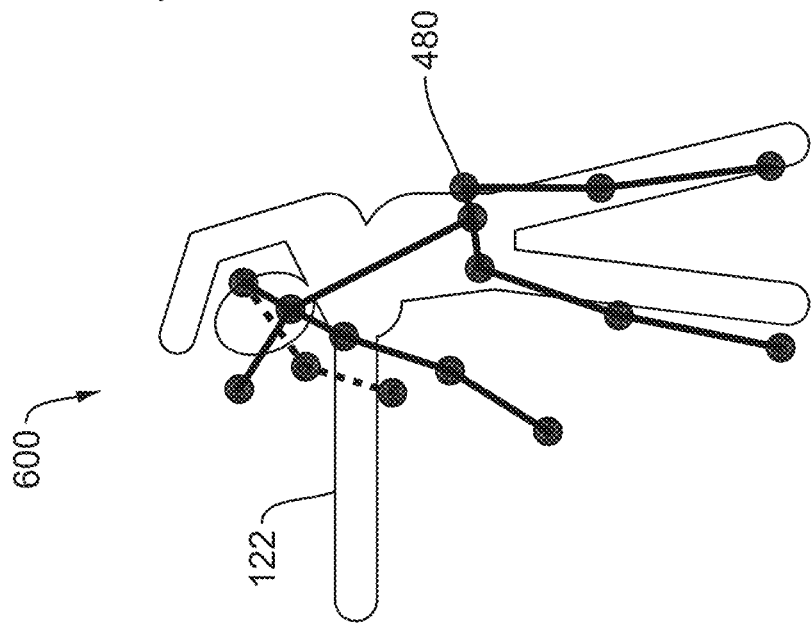
FIG. 6 is an example output display including a representation of a pose estimate and a target pose, according to an aspect of the disclosure.

FIG. 6 is an example output display 600 including a representation of a pose estimate 480 and a target pose 122, according to an aspect of the disclosure. Both the pose estimate 480 and the target pose 122 may be displayed overlaying a corresponding image (e.g., color image 410, not shown).

Figure 7:
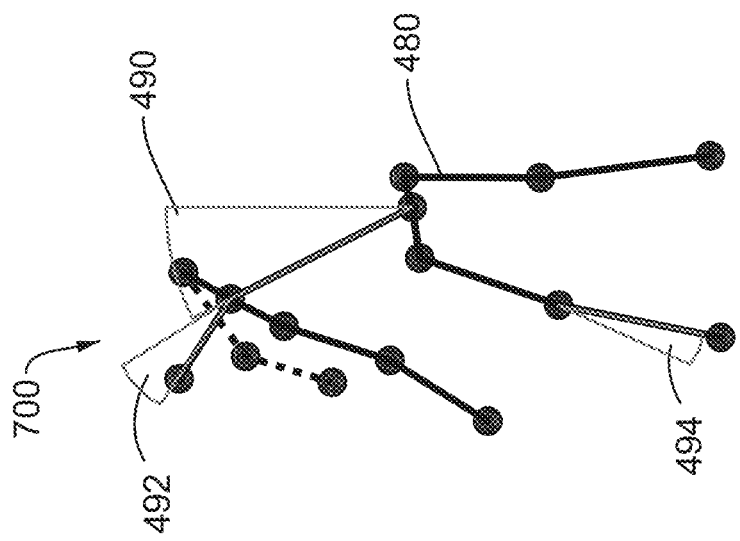
FIG. 7 is an example output display including a representation of a pose estimate and an angle difference, according to an aspect of the disclosure.

FIG. 7 is an example output display 700 including a representation of a pose estimate 480 and an angle difference 490, according to an aspect of the disclosure. The computing device 120 may determine the angle difference 490 by comparing the pose estimate 480 and the target pose 122. More specifically, an angle between lines drawn between a pair of corresponding points in each of the pose estimate 480 and target pose 122 may be determined. A visual representation of the angle difference 490 may be superimposed on the pose estimate 480. In an aspect, an angle difference 490 may be determined for multiple joints or limbs. The computing device 120 may display the greatest angle difference 490, a number of greatest differences by rank, or any angle difference that is greater than a threshold. A user 130 may use the angle difference 490 to adjust a current position toward the target pose 122, for example, by straightening the back as illustrated. Other corrections may include raising the head as illustrated by angle difference 492 and straightening the forward leg as illustrated by angle difference 494, which may also be superimposed on the pose estimate 480.

Figure 8:
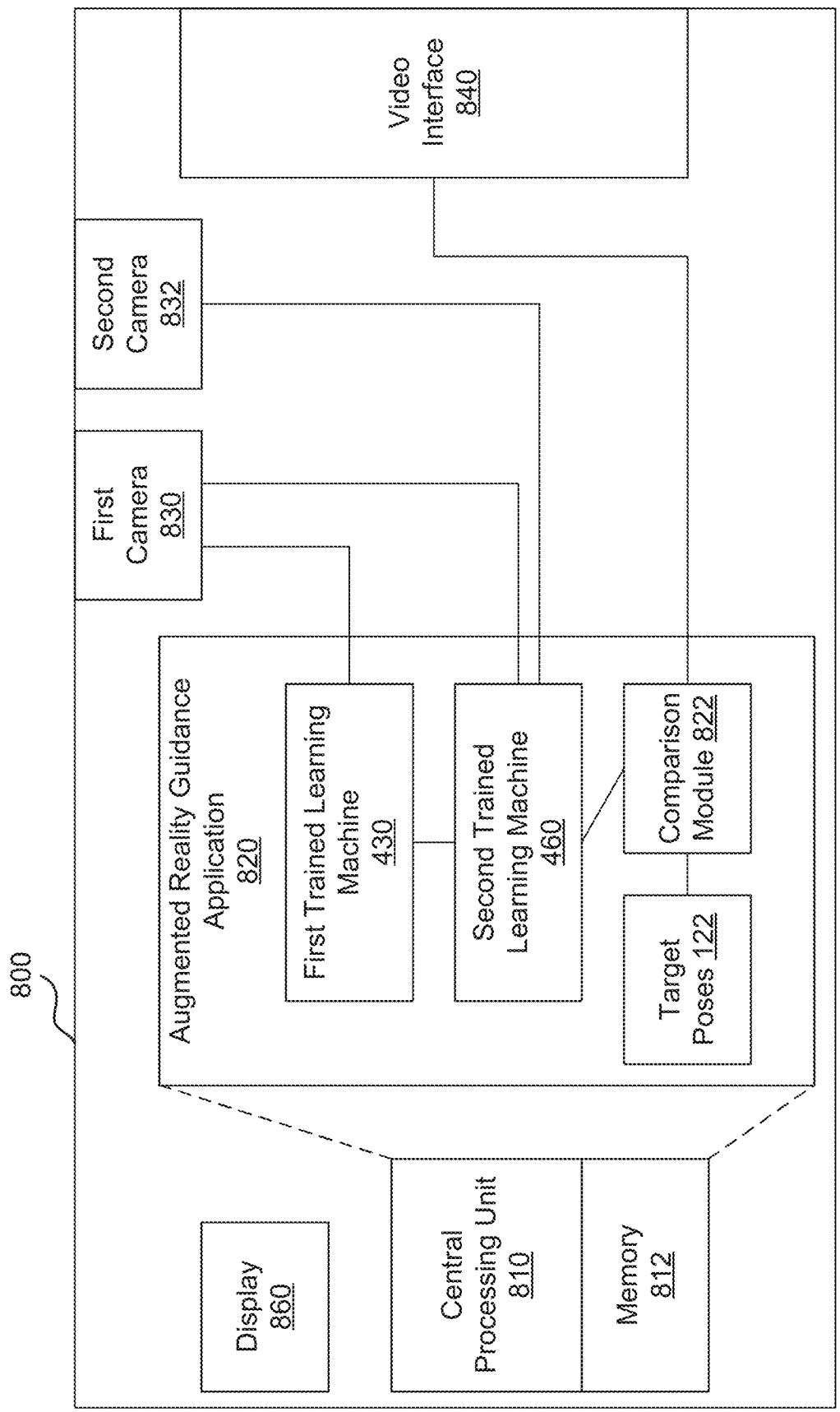
FIG. 8 illustrates a block diagram of a mobile device for providing an augmented reality body guidance system according to an exemplary aspect.

FIG. 8 illustrates a block diagram of a mobile device 800 for providing an augmented reality body guidance system according to an exemplary aspect. Mobile device 800 is an example of the computer device 120 and generally represents the computing device 120 described above. In general, mobile device 800 can be any type of mobile device, for example, and will include an operating system and a central processing unit ("CPU") 810 provided to, among other things, execute augmented reality guidance application 820. In this aspect, the augmented reality guidance application 820 can be downloaded from a server (e.g., an application store) and installed and includes software code (e.g., processor executable instructions) in memory (e.g., memory 812), which may be configured to execute/facilitate the augmented reality body guidance system 105 on the mobile device 800 according to the exemplary aspects described herein. The mobile device 800 further includes a first camera 830, a second camera 832, and a video interface 840. As noted above, the first camera 830 may be a digital color camera that provides the color image 410 to the first trained learning machine 430 and the second trained learning machine 460. The second camera 832 may be provide a depth image 420 to the second trained learning machine 460. As discussed above, the second camera 832 may be an infrared camera, or the second camera 832 may be a second color camera, and the depth image may be determined based on distance from the first camera 830 and image differences. The video interface 840 may send a video signal including a video image (e.g., color image 410) and optionally pose estimate 480, target pose 122, or angle difference 490 to the video display 110.

According to an exemplary aspect, the augmented reality guidance application 820 downloaded on mobile device 800 is configured to execute a plurality of module, including first trained learning machine 430, second trained learning machine 460, and comparison module 822. The augmented reality guidance application 820 may also include target poses 122. These modules may be part of augmented reality guidance application 820 in one exemplary aspect or separate software component(s) according to another exemplary aspect. As used herein, the term "module" refers to a software service or application executed on one or more computers, including computing device 120, components, or arrangement of components implemented using hardware, such as by an application specific integrated circuit (ASIC) or field-programmable gate array (FPGA), for example, or as a combination of hardware and software, such as by a microprocessor system and a set of instructions to implement the module's functionality, which (while being executed) transform the microprocessor system into a special-purpose device. A module can also be implemented as a combination of the two, with certain functions facilitated by hardware alone, and other functions facilitated by a combination of hardware and software. In certain implementations, at least a portion, and in some cases, all, of a module can be executed on the processor of a general purpose computer. Accordingly, each module can be realized in a variety of suitable configurations, and should not be limited to any example implementation exemplified herein. For purposes of this disclosure above with respect to the exemplary algorithms, the disclosure generally refers to the computing device 120 and/or a processor (e.g., CPU 810) and/or one of the specific modules as shown to perform the various steps of the algorithm.

As is the case for all mobile devices, mobile device 800 is generally configured to execute and/or provide a plurality of software applications for the user of the mobile device 800. For example, as described above, the augmented reality guidance application 820 can be provided by a server, as a remote application server that remotely provides software applications on mobile device 800.

Figure 9:
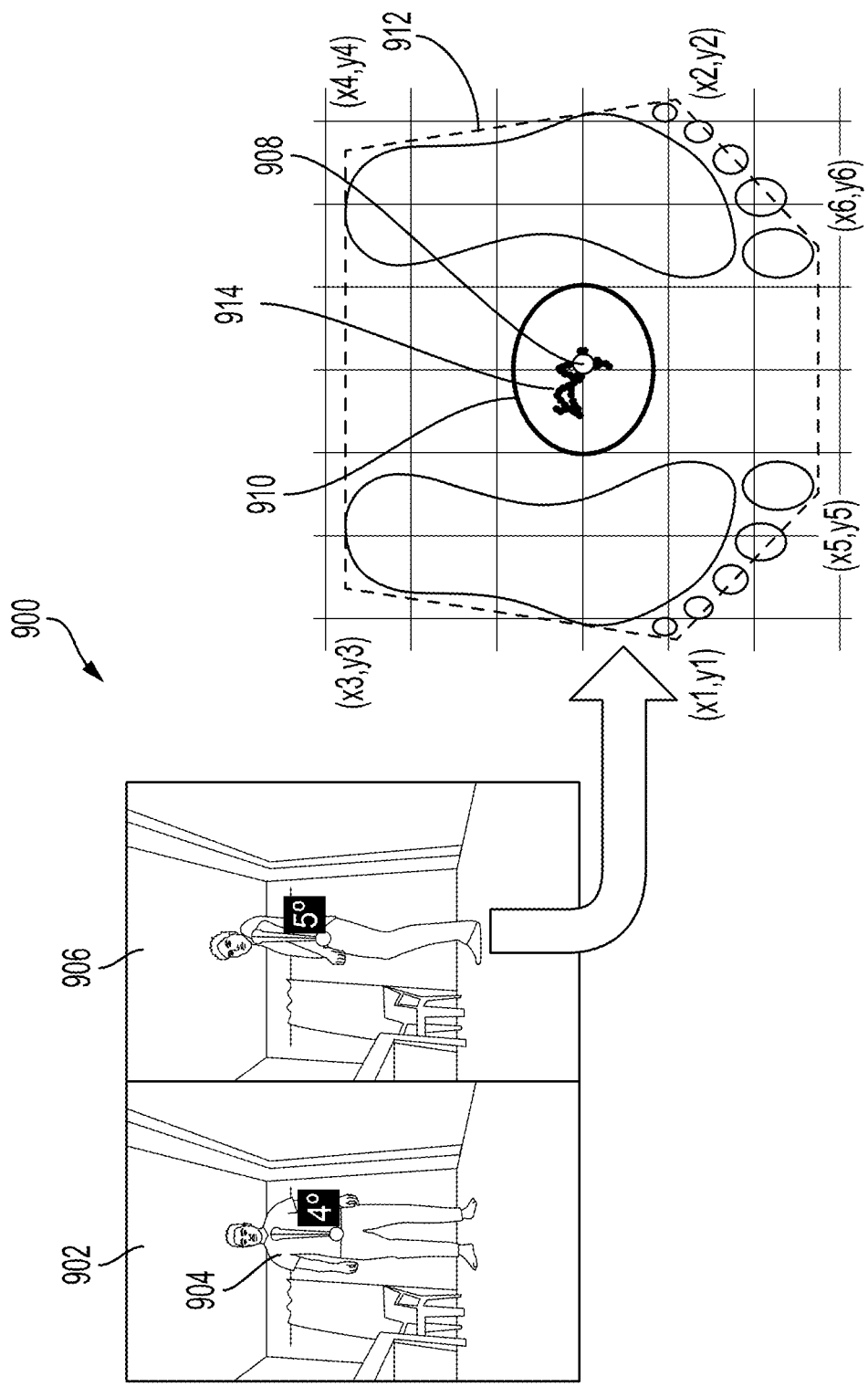
FIG. 9 is an example of visually representing the balance of a person, according to an aspect of the disclosure.

FIG. 9 is an example 900 of visually representing the balance of a person, according to another exemplary aspect of the disclosure. Evaluating the balance of an individual is useful in different scenarios. For example, a physical therapist may wish to monitor a patient's reflexes or equilibrium. When performing various poses, a patient may lose balance and may or may not correct himself/herself without falling. In another scenario, a patient may independently mimic various poses and may want to be alerted when they are attempting a pose that will cause them to lose balance. The present disclosure presents a method for quantifying and visually depicting the balance of a person.

In FIG. 9, an image 902 depicts a person 904 standing facing the computing device 120 and an image 906 depicts the person 904 facing away from the computing device 120 (to the left side). From the image 902, the computing device 120 has a visual of how the body of the person 904 may move from his left side to his right side. From the image 906, the computing device 120 has a visual of how the body of the person 904 may move forward and backward. In one aspect, images 902 and 906 may be captured by the same image capturing device (e.g., a camera), which advantageously enables a user to obtain video at his or her residence that can then be sent to a doctor for analysis, for example. In such a case, the person 904 may change the direction he is facing so that the computing device 102 may capture a front/back view of the person 104 and a side view of the person 104. In another aspect, image 902 may be captured by a first device aimed at the front/back of the person 104 and image 906 may be captured by a second device aimed at one of the sides of the person 104.

Accordingly, the computing device 120 may generate a graphical representation tracking the movement of the person 904. This graphical representation, as shown in FIG. 9, includes the feet of the person 904, a center of mass (CoM) marker 908, a first balance threshold 910, and a second balance threshold 912. In some aspects, this graphical representation is included in application 820. In one aspect, the computing device 120 may generate, for display, the graphical representation on a user interface (e.g., of a physical therapy monitoring application) of system 105. The movements performed by the person 904 are translated onto the graphical representation such that the position of the CoM marker 908 (also referred to as CoM point) changes based on a recalculation of the CoM. For example, in image 902, the person 904 leans to his right side (e.g., 4 degrees relative to an initial CoM vector aimed directly upward) and the CoM marker 908 shifts to the right (from the perspective of the person 904). Likewise, in image 906, the person 904 leans forward (e.g., 5 degrees relative to the initial CoM vector) and the CoM marker 908 shifts forward. In an aspect, the graphical representation depicts all positions of the CoM marker 908 over a period of time. This may be in the form of line 914. The first balance threshold 910 represents a limit within which the CoM marker 908 should remain to signify ideal balance. The second balance threshold 912 represents a limit beyond which the person 904 will lose balance and potentially fall. In one aspect, only the second balance threshold 912 is depicted on the graphical representation. If a patient's CoM goes outside the second balance threshold 912, the system can generate an alert that the patient is likely to lose balance and fall. Effectively, the computing device 120 can provide remote analysis (e.g., in real-time) in which the balance of an individual user can be dynamically measured to determine risks of fall and injury.

In order to generate the graphical representation, the computing device 120 calculates the CoM marker 908, the first balance threshold 910, and the second balance threshold 912. Firstly, the CoM is determined. The CoM of any individual is a function based on a plurality of segments and the pose. In one aspect, the segments comprise various body parts such as the forearms, upperarms, shanks, thighs, trunks, head, and neck. The joints and segments can be calculated using the exemplary systems and algorithms described above according to an exemplary aspect.

Moreover, these body parts include a proximal end and a distal end. For example, the right forearm includes the right wrist at the distal end and the right elbow at the proximal end. The computing device 120 may determine the CoM by multiplying the position of each segment (in the x-direction and y-direction) with its respective mass. Consider an example in which a segment vector is:

```
s= [
    ("R Forearm",r_wrist,r_elbow,0.695,0.0194),
    ("R Upperarm",r_elbow,r_shoulder,0.5754,0.0255),
    ("L Forearm",l_wrist,l_elbow,0.695,0.0194),
    ("L Upperarm",l_elbow,l_shoulder,0.5754,0.0255),
    ("R Shank",r_ankle,r_knee,0.6,0.061),
    ("R Thigh",r_knee,r_hip,0.3612,0.1478),
    ("L Shank",l_ankle,l_knee,0.6,0.061),
    ("L Thigh",l_knee,l_hip,0.3612,0.1478),
    ("Trunk",thorax,pelvis,0.3782,0.4258),
    ("Head-Neck",head_top,upper_neck,0.4841,0.0668)
]
```

This vector lists the name of a segment, the distal end of the segment, the proximal end of the segment, the relative position of the CoM along the segment (from distal to proximal), and the fraction of the segment mass over the total body mass.

The function for computing CoM may be:

function computeCoM(pose,segments):
    x=0; y=0
    M=0
    for s in segments:
        name, distal, proximal, cm, mass=s[0],s[1],s[2],s[3],s[4]

$x$+=mass*(pose[distal][1]*cm+(1.0−cm)*pose[proximal][1])

$y$+=mass*(pose[distal][0]*cm+(1.0−cm)*pose[proximal][0])

$M$+=mass return [x,y]

When the computing device 120 executes instructions following this pseudocode, the computing device 120 calculates the x-component of the CoM by first multiplying the fractional mass (e.g., s[4]) of a given segment by the sum of (1) a first product between an x-position of the distal component of the segment (e.g., pose[distal][1]) and the relative CoM position of the segment (e.g., s[3]) and (2) a second product between an x-position of the proximal end and a difference between 1 and the relative CoM position of the segment. The computing device 120 performs this calculation for each segment and sums each calculated value of the x-component across all segments.

The computing device 120 performs this same calculation for the y-component of the CoM. More specifically, the computing device 120 first multiplying the fractional mass (e.g., s[4]) of a given segment by the sum of (1) a first product between an y-position of the distal component of the segment and the relative CoM position of the segment (e.g., s[3]) and (2) a second product between an y-position of the proximal end and a difference between 1 and the relative CoM position of the segment. The computing device 120 performs this calculation for each segment and sums each calculated value of the y-component across all segments.

Having determined the x-component and y-component of the CoM, the computing device 120 may generate the CoM marker 908 on the graphical representation. In one aspect, the computing device 120 may determine a scaling factor for the CoM to account for persons of varying height. This enables the movement of the CoM marker 908 to be in terms of an intrinsic body scale (e.g., trunk length). For example, the movement of a tall person may be greater in terms of distance as compared to a short person. By applying the scaling factor on the CoM, the CoM marker 908 will not move significantly more for the tall person. This is particularly important when determining a balance score.

In one aspect, the computing device 120 calculates the second balance threshold 912 based on the foot length of a person and the distance between the feet of the person. Using image processing (or the output of a depth camera), the computing device 120 may determine the distance between the feet of the person 104 using image 902 (i.e., front view). Likewise, the computing device 120 may determine the foot length of the person using image 906 (i.e., side view).

In FIG. 9, the second balance threshold 912 can be a hexagon with the corners (x1, y1), (x2, y2), (x3, y3), (x4, y4), (x5, y5), and (x6, y6) according to an exemplary aspect. When determining foot length, the computing device 120 may determine the position of the heel of the foot, the big toe of the foot, and the little toe of the foot. Likewise, when determine distance between the feet, the computing device 120 may determine the position of the heels, the big toes, and the little toes. Collectively, the positions of the right foot (relative to the person 104) include (x3, y3) as the right heel, (x1, y1) as the right little toe, and (x5, y5) as the right big toe. The positions of the left foot (relative to the person 104) include (x4, y4) as the left heel, (x2, y2) as the left little toe, and (x6, y6) as the left big toe. In one aspect, the computing device 120 may scale these positions based on the aspect ratio of the foot image.

In one aspect, the computing device sets the first balance threshold 910 to predetermined CoM value of a healthy population. For example, the first balance threshold 910 may be represented by a particular shape (e.g., an oval). To determine the size of the shape (i.e., the limits of the first balance threshold 910), the computing device 120 may retrieve, from a database, the predetermined value representing a boundary within which 95% of CoM points exist for a healthy population. In one aspect, the computing device 120 may scale the first balance threshold 910 relative to the height and/or weight of the person 104.

In one aspect, the computing device 120 may determine a balance score of the person 104. In one aspect, the balance score represents a frequency of deviation beyond the first balance threshold 910 over a period of time (e.g., while the person 104 is performing an exercise). For example, the computing device 120 may calculate an amount of CoM points (tracked as the CoM marker 908 moves) that were within the first balance threshold 910 over a period of time and divide this amount by the total amount of CoM points. For example, over the period of time, the person 104 may lose ideal balance (i.e., within the first balance threshold 910) frequently. More specifically, the computing device 120 may determine a first amount of times that the center of mass was calculated over the period of time, determine a second amount of times that the center of mass exceeded the first balance threshold, and calculate a ratio between the second amount and the first amount (here the ratio is the balance score).

In another aspect, the balance score may represent the magnitude of a deviation beyond the first balance threshold 910. For example, the person 104 may lose ideal balance momentarily, but with a much bigger deviation. In this case, the computing device 120 may calculate the difference between a peak CoM point (i.e., a point to which the CoM extends to and returns from) and the closet point along the first balance threshold 910.

In yet another aspect, the balance score may represent the proximity to the second balance threshold 912. As discussed before, the second balance threshold 912 represents a limit beyond which the person 104 may fall if the CoM of the person 104 extends to such extent. The closer the CoM of the person 104 gets to the second balance threshold 912, the greater imbalance the person 104 has. Accordingly, the computing device 120 may calculate the balance score based on the difference between each peak CoM point and the closest point along the second balance threshold 912. For example, the computing device 120 may determine differences between the center of mass and points on the second balance threshold over the period of time, and calculate the balance score based on a magnitude of the differences.

Figure 10:
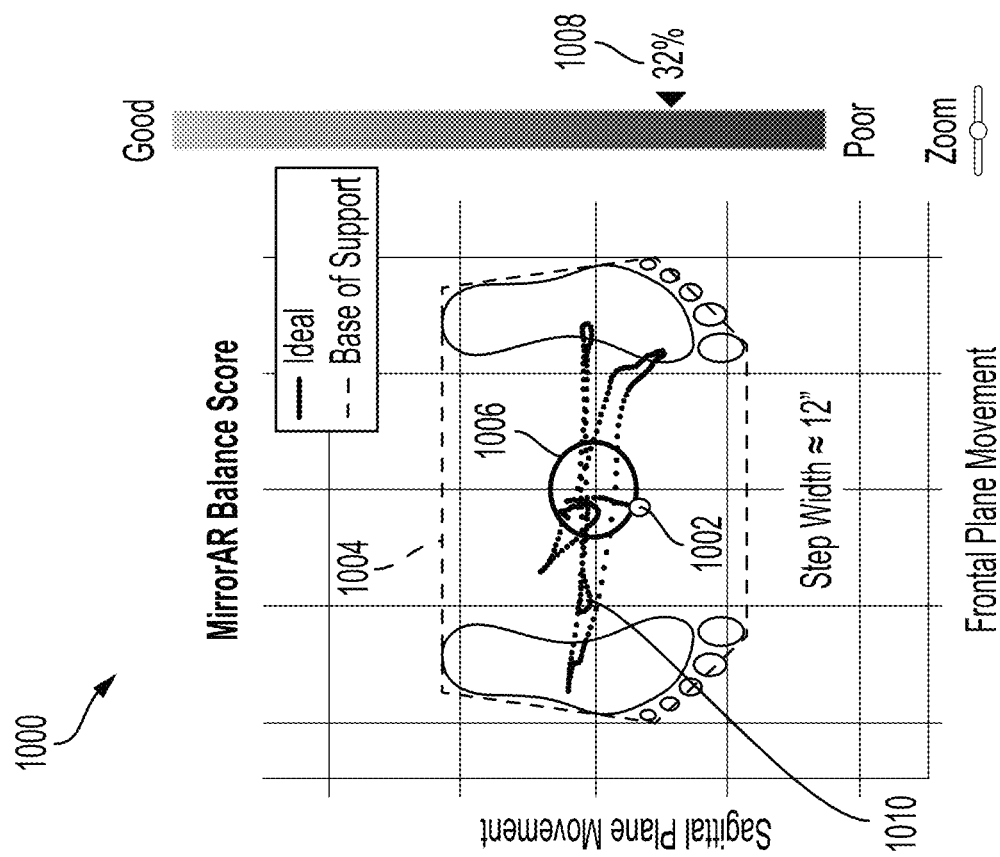
FIG. 10 is an example of the visual representation of balance based on a wide distance between the feet of a person, according to an aspect of the disclosure.

FIG. 10 is an example 1000 of the visual representation of balance based on a wide distance between the feet of a person, according to an aspect of the disclosure. In FIG. 10, CoM marker 1002 of a person has been tracked along line 1010 which represents a plurality of historical CoM points. In this example, the distance between the feet (referred to as step width) is approximately 12 inches. It should be noted that the distance may be conveyed in any distance unit (e.g., cm, feet, etc.). The computing device 120 calculates the first balance threshold 1006 and the second balance threshold 1004. Based on any of the calculation methods of the balance score described above, the computing device 120 may determine score 1008. In this example, because the CoM marker 1002 has deviated frequently and with great magnitude, score 1008 is 32%.

Figure 11:
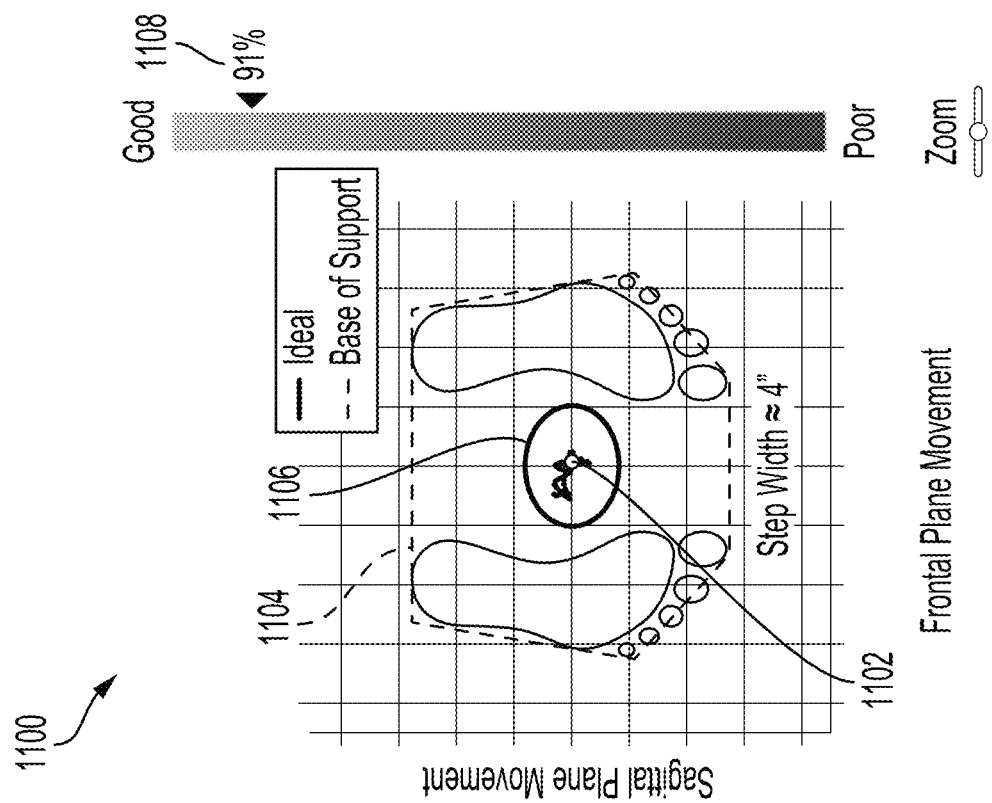
FIG. 11 is an example of the visual representation of balance based on a narrow distance between the feet of a person, according to an aspect of the disclosure.

FIG. 11 is an example 1100 of the visual representation of balance based on a narrow distance between the feet of a person, according to an aspect of the disclosure. In FIG. 11, the distance between the feet is 4 inches. Because the second threshold balance 1104 is smaller than the second threshold balance 1004, the person has a greater chance of falling if the CoM marker 1102 deviates well beyond the first balance threshold 1106. In other words, depending on the stance of a user, the balance score of the person may change significantly. In FIG. 11, CoM marker 1102 has deviated slightly from its original position. Considering that the score 1108 is calculated relative to the distance from the second balance threshold 1104 in this example, the score is not a perfect 100%. It should be appreciated that if the same deviations in FIG. 11 took place with the step width depicted in FIG. 10, the score 1108 would be greater because the second balance threshold 1004 is farther.

In some aspects, the computing device 120 may determine whether the balance score is less than a threshold balance score, and in response to determining that the balance score is less than a threshold balance score, may generate an alert on the user interface. The alert may be a warning that the user is about to lose balance and to reposition himself/herself. In some aspects, the alert may further indicate instructions for regaining balance.

Figures 12, 13:
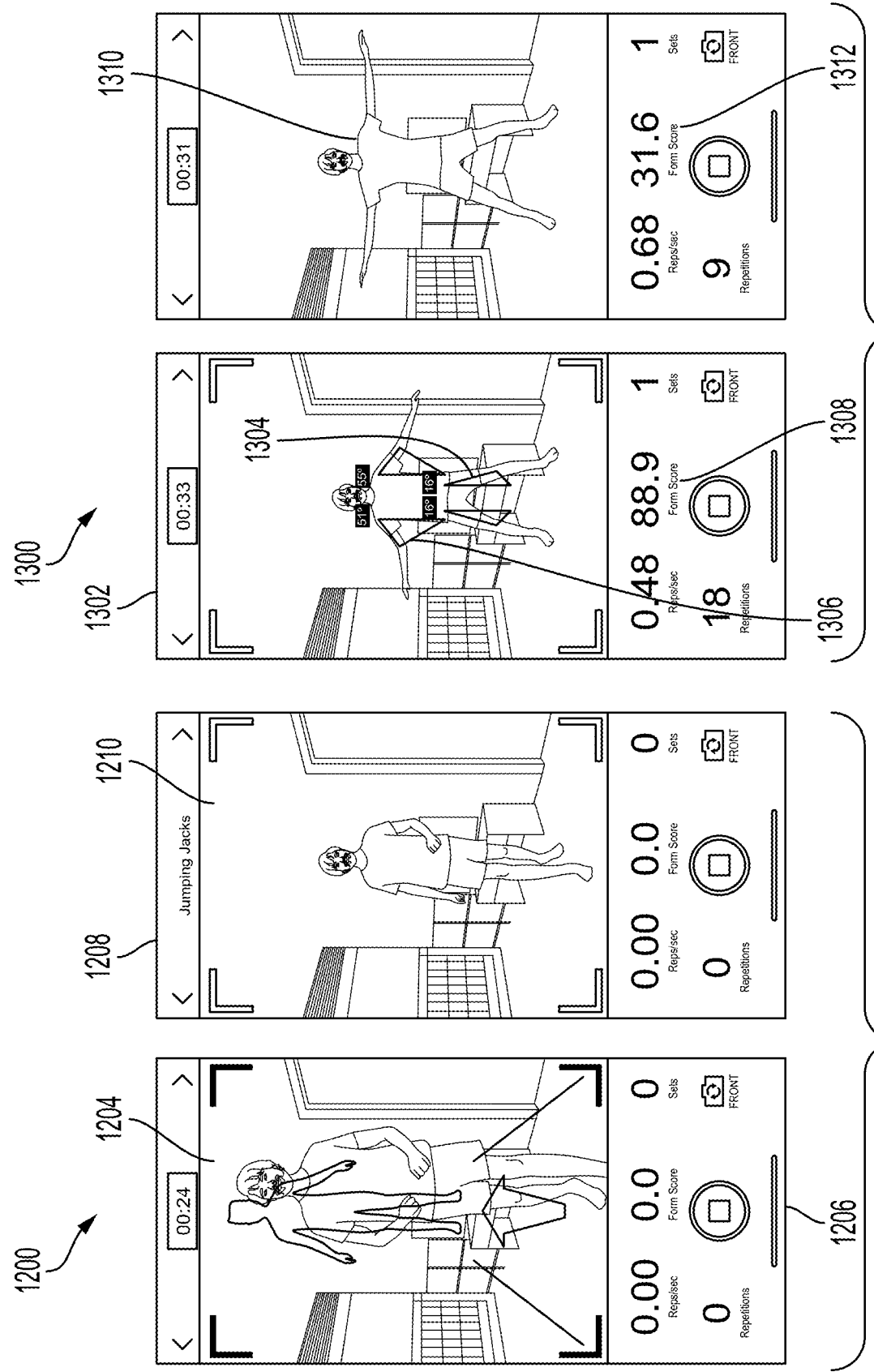
FIG. 12 is an example of a user interface depicting positional correction relative to a camera, according to an aspect of the disclosure.
FIG. 13 is an example of a user interface depicting form evaluation for a given movement, according to an exemplary aspect.

FIG. 12 is an example user interface 1200 depicting positional correction relative to a camera, according to an aspect of the disclosure. In one aspect, the user interface 1200 is generated by system 105 as a part of application 820. In one aspect, the capturing of images to approximate and evaluate pose/movement is supplemented by image filtering. User interface 1200 may be part of a monitoring application (e.g., for rehab, physical therapy, and/or exercise). The computing device 120 executing the monitoring application may receive/capture image frames and evaluate whether a person is standing in a particular region of the frame. For example, in frame 1204 depicted in a first snapshot 1202 of user interface 1200, the person of interest is not fully in the frame. In response to determining that at least one portion of the person of interest is not in the frame, the computing device 120 may generate an alert on the user interface prompting the person to reposition themselves. In one aspect, the alert may appear in a particular color (e.g., red) and in one aspect, may also include graphics indicating where the person should stand to fully enter the frame (e.g., a partially transparent image of a body outline where the person should align themselves).

In the second snapshot 1208 of user interface 1200 (e.g., at a later time), the computing device 120 detects that the person is fully in the frame and enables monitoring. Enabling monitoring may involve activating portion 1206 of user interface 1200. Portion 1206 includes measurement values such as exercise repetitions, form score, sets, etc., which are discussed further in FIG. 13.

FIG. 13 is an example user interface 1300 depicting form evaluation for a given movement, according to an exemplary aspect. In one aspect, the user interface 1300 is generated by system 105 as a part of application 820. A first snapshot 1302 of user interface 1300 depicts a person performing an exercise (e.g., jumping jacks). As described in FIG. 3, the computing device 120 may identify the person in the frame and initiate the pose estimation process. In one aspect, the person may be able to select from a plurality of exercises/movements to perform. It should be noted that these exercises/movements are equivalent to the tracked poses described in FIG. 3. The form score 1308 represents a similarity between a target movement and a performed movement (i.e., a similarity of the performance captured in the images to a target performance of the tracked pose). In one aspect, the form score is a quantitative assessment (e.g., 4 out of 10). In another aspect, the form score is a qualitative assessment (e.g., good, bad, etc.). The performance data of the target movement/tracked pose may be stored in a database that tracks the angles between joints, motions, timing, etc., pre-labelled as ideal for a plurality of target poses.

As discussed previously, a tracked pose contains a series of sets of joint positions, each set being called a segment, which typically include timing requirements. A tracked pose may be used for an exercise such as squats, for example. In order to execute a good squat, the user should be in proper form when they stand, when they descend, when they squat, and when they ascend. The system 105 may compare the current pose to the target pose 122 for each of the positions, as well as measure the time between the poses.

In one aspect, a first trained learning machine may be configured to segment a visual image and isolate the body of a person in the visual image. The computing device 120 may then estimate a position of a plurality of joints of the body by applying a second trained learning machine. The second trained learning machine may output a series of estimated 2D or 3D coordinates of joints.

In an exemplary aspect, the form score is computed as a weighted combination of reward and penalty criteria. The reward criteria comprise positive factors based on achieving partial or full range of motion for a given set of body angles and/or joint positions. The penalty criteria comprise negative factors based on extraneous movements or unwanted range of motion for a given set of body angles and/or joint positions.

For each exercise/movement, the computing device may identify joints of the body that can be used to calculate the form score 1308. In the case of jumping jacks, the joints used to calculate the form score may be in the legs and the arms. The computing device 120 may determine, from a plurality of possible joints, the set of joints associated with the tracked pose by referring to a data structure in memory that maps each tracked pose in a plurality of tracked poses to a respective set of joints used to assess a respective performance (e.g., of a movement).

Subsequent to identifying the joints, the computing device 120 creates joint vectors. In some aspects, the computing device 120 may generate at least one joint vector connecting joints in the set of joints by referring to the data structure, wherein the data structure further indicates how the respective set of joints are connected. For example, in the case of jumping jacks, the list of joints may include the ball-and-socket joints (at the shoulders) and the hinge joints (at the elbows) of the arms. Accordingly, a first joint vector is formed from the right ball-and-socket joint and right hinge joint of the right arm. The computing device 120 also creates a second joint vector from the left ball-and-socket joint and left hinge joint of the left arm. The list of joints may also include the hip joints and knee joints of the legs. The computing device 120 thus creates a third joint vector and a fourth joint vector for the right leg and the left leg respectively. Each vector is formed such that the positions of the included joints are found as points on the vector.

In one aspect, the computing device 120 identifies vectors normal to the floor to provide reference to each of the joint vectors. In another aspect, the computing device 120 generates these vectors by drawing a vertical/horizontal line on the visual image. For example, the computing device 120 may overlay a visual representation of the at least one joint vector over the visual video stream on the video display. In some aspects, the visual representation is overlaid in real time. Having determined these vectors, the computing device 120 determines the angles between the joint vectors and the reference vectors. In one aspect, the computing device 120 may generate for display the vectors and angles as an overlay on the visual image. In snapshot 1302 of user interface 1300, a person is shown performing a jumping jack. Angle 1304 represents the angle between a joint vector on the left leg and a reference vector (e.g., 16 degrees) and angle 1306 represents the angle between the first joint vector on the right arm and a reference vector (e.g., 51 degrees).

The computing device 120 captures and determines joint positions, angles, and the velocities of movement. In one aspect, the computing device 120 determines repetitions (used interchangeably with periodicities). For each repetition the following metrics are computed for each angle and joint position: (1) a fraction of desired range of motion (ROM) over the target range of motion (reward criterion)—if this fraction is greater than one, the computing device 120 sets the fraction to 1, and (2) a fraction of unwanted range of motion over a max penalty for that motion (penalty criterion)—if this fraction is greater than the max penalty, the computing device 120 sets the fraction to 1. In some aspects, the computing device 120 may track an amount of repetitions for the tracked pose over a period of time and recalculate the form score for each repetition.

The computing device 120 then sums the positive factors associated with the reward criteria. The computing device 120 also sums the negative factors associated with the penalty criteria. In some aspects, each factor is weighted according to their clinical importance for the exercise.

The computing device then computes the form score by summing the reward and penalty terms (i.e., each of the sums discussed above). If the result is less than 0, the form score is set to 0. In some aspects, the computing device 120 multiplies the form score by 100 and presents the score on user interface 1300 as a percentage in the range of 0-100% (e.g., score 1308 is 88.9%). In some aspects, the computing device 120 may convert the form score from a quantitative value to a qualitative value by referring to a data structure that indicates a mapping. For example, a form score in 0-50% range may be considered "poor," a form in the 50%-75% range may be considered "medium," a form in the 75%-90% range may be considered "good," and a form above 90% may be considered "excellent." In FIG. 13, snapshot 1302 may thus indicate that the form score is "good." For example, instead of or in addition to saying 88.9, the snapshot 1302 may say "good."

In some aspects, the form score also based on an amount of time it takes to perform a tracked poses. For example, a single jumping jack may take up to 1 second to perform. Even if a person is performing the proper jumping jack motion, if the time it takes to perform the motion is significantly greater than 1 second (e.g., 3 seconds), the person may be performing the tracked pose incorrectly. Accordingly, the computing device 120 may determine an amount of time taken to perform the tracked pose and scale the form score by, for example, the ratio between a target amount of time and the amount of time taken. In this case, the greater the deviation from the target time, the greater the penalty applied to the form score.

A snapshot 1310 of the user interface 1300 indicates a lower form score 1312 because the person has deviated from the target pose. It should be noted that the overlap of the angles and vectors on the visual image is optional. For example, the snapshot 1310 lacks the overlay shown in the snapshot 1302 on the body of the person, but a form score and other exercise information is still calculated.

In one aspect, the computing device 120 may determine whether the form score is less than a threshold form score, and in response to determining that the form score is less than the threshold form score, overlay, on the visual video stream, a visual representation of the tracked pose for guidance. For example, the visual representation may be a semi-transparent outline of a person performing the tracked pose.

In one aspect, the computing device 120 determines the form score using the equation:

$$\text{form score} = \max\left[1, \sum_{i=1}^{N} \rho_i^+ \times \frac{(\text{Measured } ROM)_i^+}{(\text{Target } ROM)_i^+}\right] - \frac{1}{M}\sum_{i=1}^{M} \rho_i^- \times \frac{(\text{Measured } ROM)_i^-}{(\text{Max } ROM)_i^-}$$

here, the computing device 120 calculates measured ROM as

Measured $ROM_i = \min[\max(x_{ik}), \max(z_{ik})]_{k \in R} - \max[\min(x_{ik}), \min(z_{ik})]_{k \in R}$, where $z_{ik}$=target trajectory for i-th position or angle
$x_{ik}$=measured trajectory for i-th position or angle
R=single period of repetition (rep)
$\rho_i^+$=reward weights assigned to i-th position or angle
$\rho_i^-$=penalty weights assigned to i-th position or angle The trajectory is an array or a sequence of values collected over a repetition cycle (e.g., the values of the angles or positions measured over a particular time interval). $X_{ik}$ is the specific angle/position indexed by i. In this case, k indexes the time position in the sequence over a period of time (e.g., a repetition cycle). For example, $x_{09}$ may represent an angle (e.g., 56 degrees) for the first elbow index (0) and is the $9^{th}$ measurement in the period of time (e.g., repetition cycle).

Figure 14:
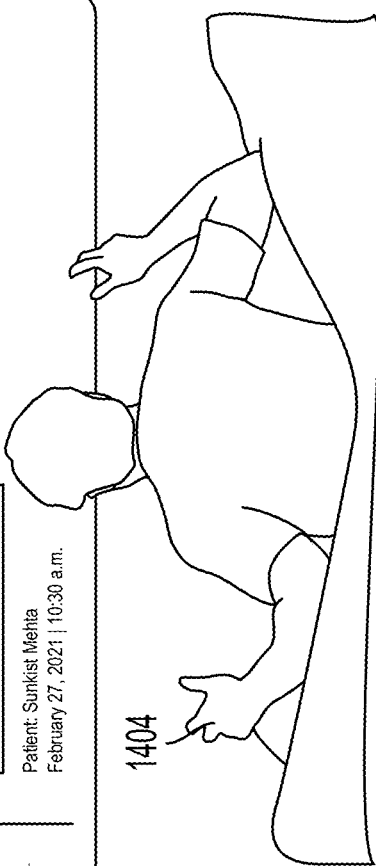
FIG. 14 is an example of a user interface providing tele-rehabilitation, according to an exemplary aspect.

FIG. 14 is an example of user interface 1400 providing tele-rehabilitation for a person 1402, according to an exemplary aspect. In an exemplary aspect, person 1402 may be a patient and person 1404 may be a healthcare provider (e.g., physical therapist). Due to the rapid progress in communication technology, tele-rehabilitation is now possible. In order for a viable and billable tele-rehabilitation session to occur, it is critical that a visit be comprised of a synchronous videoconference with video and audio connectivity between a patient and a healthcare provider. This tele-rehabilitation episode can be an evaluation, re-evaluation, or a treatment session.

Though the current system of tele-rehabilitation allows for easy connectivity and reduces the burden on patients to travel for face-to-face visits, it poses significant challenges such as the lack of an accurate and objective method for measuring a patient's functional deficits including joint range of motion, gait, balance, and efficiency in performing various functional tasks. Without these measurements, a therapy evaluation is incomplete. Unfortunately, conventional video conferencing systems only allow for subjective assessments of these parameters, and lack objective guidance and compliance monitoring that otherwise is possible in a face-to-face visit.

The present disclosure thus presents a module of application 820 that is configured to provide tele-rehabilitation features that address these shortcomings. FIG. 14 depicts an example user interface 1400 that facilitates conversation between persons 1402 and 1404. As depicted from the perspective of person 1404, user interface 1400 displays a video feed (either live or recorded) of person 1402 performing a poses such as arm raises. There is an overlay 1406 indicative of the target pose on person 104's image (e.g., depicting where the arms of person 1402 need to be to perform the pose). Based on person 1402's performance, computing device 120 may make objective assessments and provide them to person 1404 under the "observations and notes" section. For example, a balance score or a weight score may be determined by computing device 120 and displayed on user interface 1400.

On a technical level, computing device 120 may be configured to establish a network connection (e.g., over the Internet) with a different computing device (e.g., a smartphone of a healthcare provider) and enable a video call with the different computing device over the network connection. As depicted in FIG. 14, a video stream of the video call is generated on user interface 1400. Computing device 120 of the patient may also transfer the objective assessment (e.g., form score, balance score, range of motion, etc.) to the different computing device. In some aspects, both computing device 120 and the different computing device may generate, for display, historic assessments on user interface 1400 such as a plurality of balance scores and a plurality of form scores.

In some aspects, person 1404 may enter his/her feedback in the "observations and notes" section. In some aspects, computing device 120 may also receive the selection of the tracked pose to perform from the different computing device (e.g., from the healthcare provider). For example, computing device 120 may receive pose selections via a menu of user interface 140 (e.g., pose dropdown menu) from either person 1402 or person 1404 and retrieved the tracked pose data to determine various scores and assessments (as described previously). Application 820 may offer other features such as exercise reminders, assignments (from healthcare provider to patient), real-time video/audio calling, and the option to save video clips for future reference. In some aspects, application 820 may store the various objective assessments of person 1402 and generate them for display in a table for progress evaluation.

In some aspects, application 820 may offer real-time objectives for velocity and acceleration of joint angles, may evaluate functional task performance based on both quality of movement and time taken to perform functional task, and/or may offer real-time evaluation of gait and balance. In some aspects, application 820 may provide enhanced ability to perform goal-based, therapist-guided exercise and compliance monitoring due to real time measurements. Application 820 may also allow therapists to perform instantaneous correction of a wrong or an inadequate movement based on what they see in the live video and the objective assessments made by computing device 120. In some aspects, application 820 may provide, via the cloud, rich portal data of the previous treatment sessions or evaluation for review and documentation. For example, application 820 may maintain and update a video medical record of previous evaluation and treatments. In some aspects, application 820 may have portability such that it may connect to a display device (e.g., a TV) both wirelessly (e.g., via the Internet or cellular data) and/or via a wired medium (e.g., HDMI).

This proposed technology allows for significantly increased reliability, accuracy, and effectiveness of tele-rehabilitation to treat specific patient problems because it expands the ability of the therapist to evaluate and treat patients. The system allows for assessments that include objective data about range of motion, gait, balance and functional tasks and exercises. All of these are not possible today with traditional tele-rehabilitation systems that use a two-way synchronous audio and video. In addition, the rich data set will allow for more intelligent use of therapy resources for developing specificity of treatment methods by using machine learning and artificial intelligence.

Figure 15:
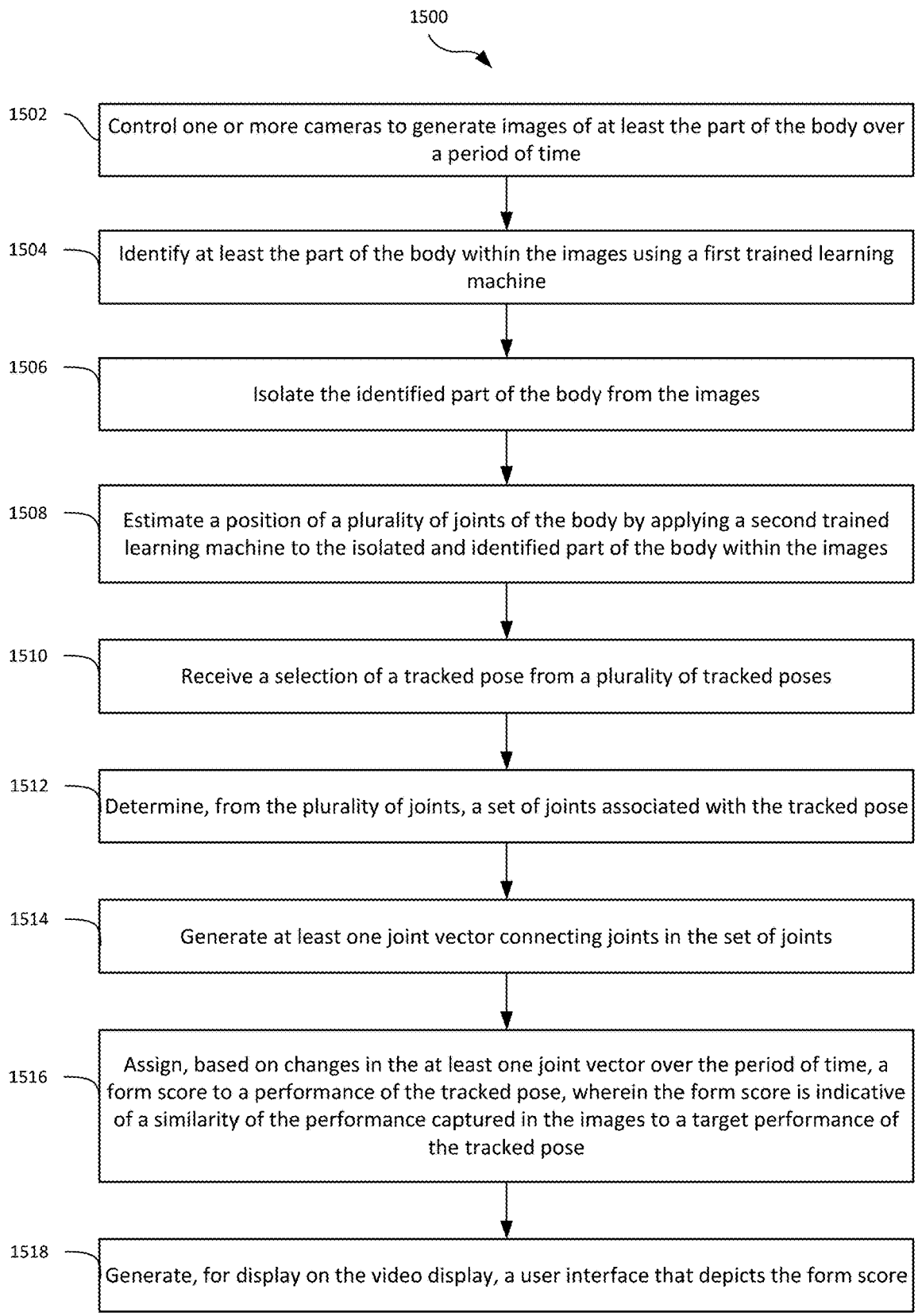
FIG. 15 is a flow diagram of an example method of evaluating movement of at least a part of a body of a user, according to an aspect of the disclosure.

FIG. 15 is a flow diagram of method 1500 of evaluating movement of at least a part of a body of a user, according to an aspect of the disclosure. At block 1502, a processor of computing device 120 (e.g., a hardware processor) controls one or more cameras to generate images of at least the part of the body over a period of time. At block 1504, the processor identifies at least the part of the body within the images using a first trained learning machine. At block 1506, the processor isolates the identified part of the body from the images. At block 1508, the processor estimates a position of a plurality of joints of the body by applying a second trained learning machine to the isolated and identified part of the body within the images. At block 1510, the processor receives a selection of a tracked pose from a plurality of tracked poses. At block 1512, the processor determines, from the plurality of joints, a set of joints associated with the tracked pose. At block 1514, the processor generates at least one joint vector connecting joints in the set of joints.

At block 1516, the processor assigns, based on changes in the at least one joint vector over the period of time, a form score to a performance of the tracked pose, wherein the form score is indicative of a similarity of the performance captured in the images to a target performance of the tracked pose. In some aspects, the processor is further configured to assign the form score to the performance of the tracked pose by determining changes in joint vectors associated with the target performance, comparing the changes in the joint vectors associated with the target performance with the changes in the at least one joint vector over the period of time, and determining the form score based on the comparison between the respective changes. In some aspects, the form score is a function of a reward criterion and a penalty criterion, and the processor is further configured to determine the form score based on the comparison by determining the reward criterion comprising positive factors for achieving partial or full range of motion for the tracked pose, determining the penalty criterion comprising negative factors based on extraneous movements or unwanted range of motion the tracked pose, and calculating the form score based on the reward criterion and the penalty criterion.

At block 1518, the processor generates, for display on the video display, a user interface that depicts the form score.

Figure 16:
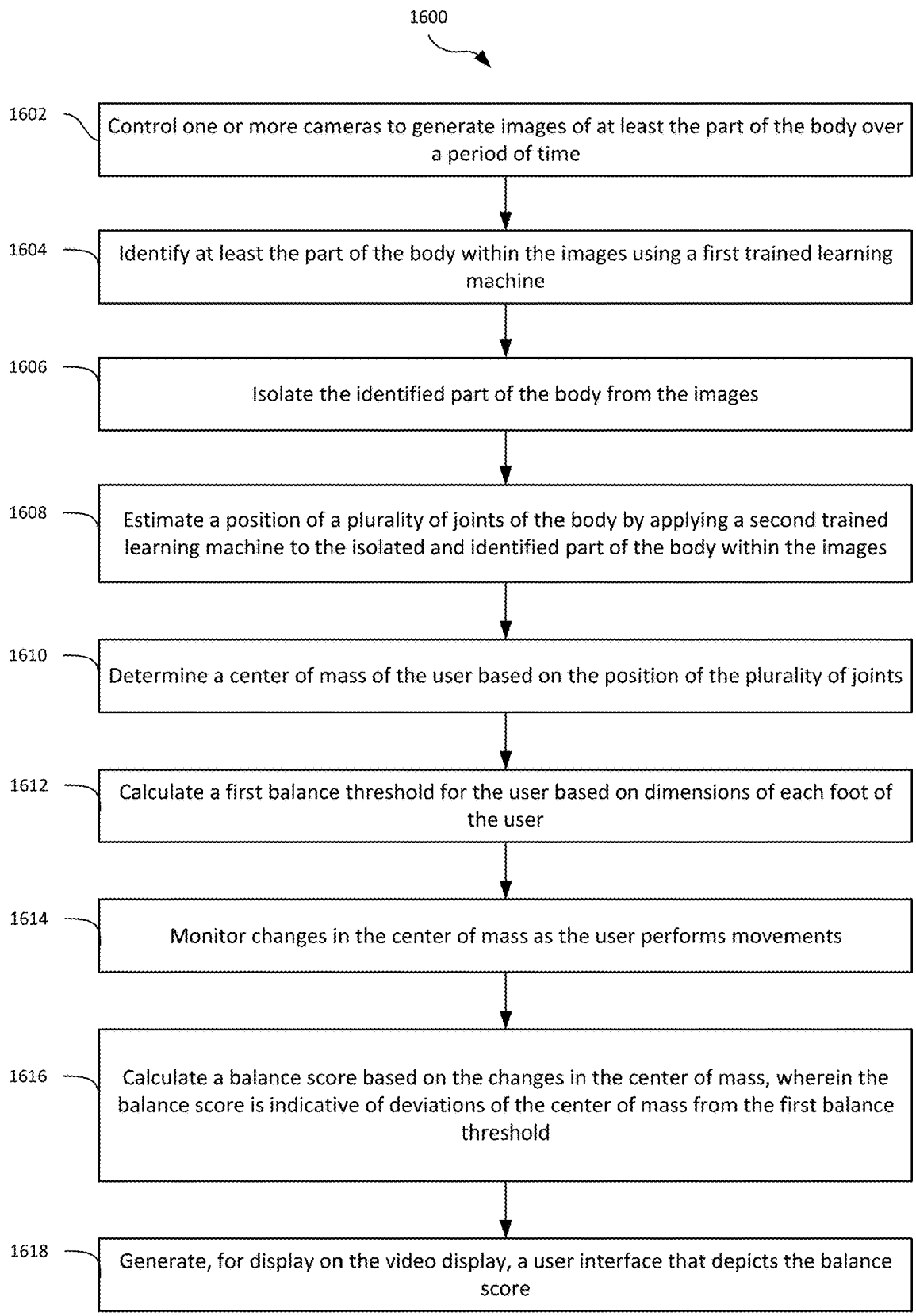
FIG. 16 is a flow diagram of an example method of evaluating physical balance of a user, according to an aspect of the disclosure.

FIG. 16 is a flow diagram of method 1600 of evaluating physical balance of a user, according to an aspect of the disclosure. At block 1602, a processor of the computing device 120 controls one or more cameras to generate images of at least the part of the body over a period of time. At block 1604, the processor identifies at least the part of the body within the images using a first trained learning machine. At block 1606, the processor isolates the identified part of the body from the images. At block 1608, the processor estimates a position of a plurality of joints of the body by applying a second trained learning machine to the isolated and identified part of the body within the images. At block 1610, the processor determines a center of mass of the user based on the position of the plurality of joints. At block 1612, the processor calculates a first balance threshold for the user based on dimensions of each foot of the user. At block 1614, the processor monitors changes in the center of mass as the user performs movements. At block 1616, the processor calculates a balance score based on the changes in the center of mass, wherein the balance score is indicative of deviations of the center of mass from the first balance threshold. At block 1618, the processor generates, for display on the video display, a user interface that depicts the balance score.

Figure 17:
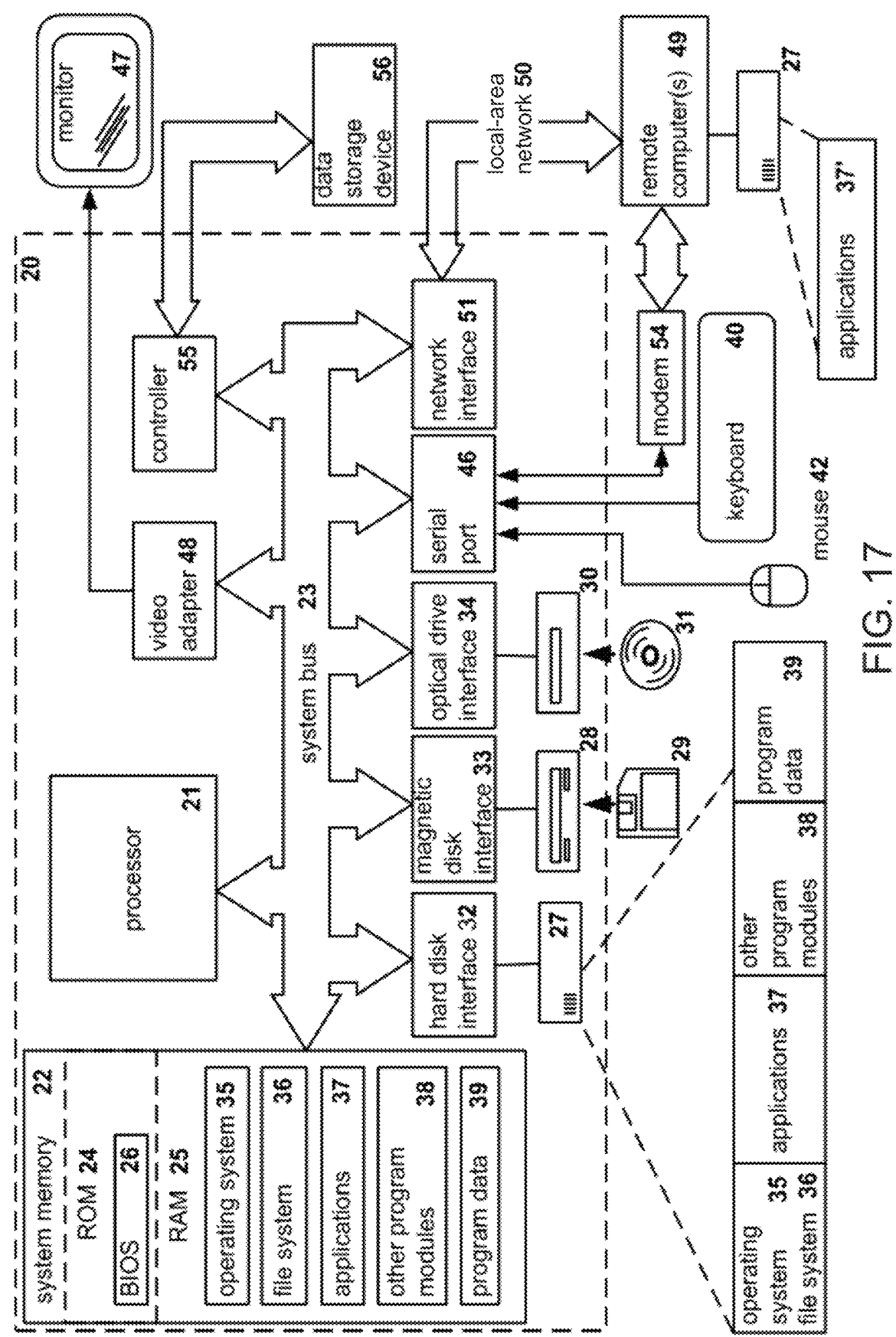
FIG. 17 illustrates a block diagram of an example of a general-purpose computer system on which the disclosed system and method can be implemented according to an example aspect.

FIG. 17 illustrates a block diagram of an example of a general-purpose computer system on which the disclosed system and method can be implemented according to an example aspect. As shown, a general purpose computing device is provided in the form of a computer system 20 or the like including a processing unit 21, a system memory 22, and a system bus 23 that couples various system components including the system memory to the processing unit 21. It should be appreciated that computer system 20 can correspond to computing device 120 described above, processing unit 21 can correspond to the CPU 810, and system memory 22 can correspond to memory 812 according to various exemplary aspects.

Moreover, the system bus 23 may be any of several types of bus structures including a memory bus or memory controller, a peripheral bus, and a local bus using any of a variety of bus architectures. The system memory includes read-only memory (ROM) 24 and random access memory (RAM) 25. A basic input/output system 26 (BIOS), containing the basic routines that help transfer information between elements within the computer 20, such as during start-up, is stored in ROM 24.

The computer 20 may further include the hard disk drive 27 for reading from and writing to a hard disk, a magnetic disk drive 28 for reading from or writing to a removable magnetic disk 29, and an optical disk drive 30 for reading from or writing to a removable optical disk 31 such as a CD-ROM, DVD-ROM or other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide non-volatile storage of computer readable instructions, data structures, program modules and other data for the computer 20.

A number of program modules may be stored on the hard disk, magnetic disk 29, optical disk 31, ROM 24 or RAM 25, including an operating system 35. The computer 20 includes a file system 36 associated with or included within the operating system 35, one or more application programs 37, other program modules 38 and program data 39. A user may enter commands and information into the computer 20 through input devices such as a keyboard 40 (which can correspond to display 860) and pointing device 42. Other input devices (not shown) may include a microphone, joystick, game pad, satellite dish, scanner or the like.

These and other input devices are often connected to the processing unit 21 through a serial port interface 46 that is coupled to the system bus, but may be connected by other interfaces, such as a parallel port, game port or universal serial bus (USB). A monitor 47 or other type of display device is also connected to the system bus 23 via an interface, such as a video adapter 48. In addition to the monitor 47, personal computers typically include other peripheral output devices (not shown), such as speakers and printers.

The computer 20 may operate in a networked environment using logical connections to one or more remote computers 49. The remote computer (or computers) 49 may be another computer, a server (e.g., servers 24A to 24N), a router, a network PC, a peer device, physical equipment and/or other common network node, and typically includes many or all of the elements described above relative to the computer 20. The logical connections include a network interface or adapter 53 and connected to a local area network (i.e., LAN) 50, for example, and/or a wide area network (not shown). Such networking environments are commonplace in offices, enterprise-wide computer networks, Intranets and the Internet.

When used in a LAN networking environment, the computer 20 is connected to the local area network 50 through a network interface 51 or adapter 53. When used in a WAN networking environment, the computer 20 typically includes a modem 54 or other means for establishing communications over the wide area network, such as the Internet. Moreover, the modem 54, which may be internal or external, is connected to the system bus 23 via the serial port interface 46. In a networked environment, program modules depicted relative to the computer 20, or portions thereof, may be stored in the remote memory storage device. It will be appreciated that the network connections shown are exemplary and other means of establishing a communications link between the computers may be used.

In various aspects, the systems and methods described herein may be implemented in software, in which the methods may be stored as one or more instructions or code on a non-volatile computer-readable medium. Computer-readable medium includes data storage. By way of example, and not limitation, such computer-readable medium can comprise RAM, ROM, EEPROM, CD-ROM, Flash memory or other types of electric, magnetic, or optical storage medium, or any other medium that can be used to carry or store desired program code in the form of instructions or data structures and that can be accessed by a processor of a general purpose computer.

The invention claimed is:

1. A system for evaluating physical balance of a user, comprising:
a video display;
one or more cameras configured to generate a visual video stream; and
a computing device comprising:
a memory storing computer executable instructions; and
a processor configured to execute the computer executable instructions to:
control the one or more cameras to generate images of at least a part of a body of the user over a period of time;
identify at least the part of the body within the images using a first trained learning machine;
isolate the identified part of the body from the images;
estimate a position of a plurality of joints of the body by applying a second trained learning machine to the isolated and identified part of the body within the images;
determine a center of mass of the user based on the position of the plurality of joints;
calculate a first balance threshold for the user based on dimensions of each foot of the user;
monitor changes in the center of mass as the user performs movements; and
calculate a balance score based on the changes in the center of mass, wherein the balance score is indicative of deviations of the center of mass from the first balance threshold;
generate, for display on the video display, a user interface that depicts the balance score.

2. The system of claim 1, wherein the processor is further configured to calculate the balance score by:
determining a first amount of times that the center of mass was calculated over the period of time;
determining a second amount of times that the center of mass exceeded the first balance threshold; and
calculating a ratio between the second amount and the first amount, wherein the ratio is the balance score.

3. The system of claim 1, wherein the first balance threshold is a predetermined value indicative of ideal balance, and wherein the processor is further configured to determine a second balance threshold indicative of a limit at which balance is lost.

4. The system of claim 3, wherein the processor is configured to determine the second balance threshold by:
determining a length of each foot of the user, a distance between each foot, and a width of each foot;
generating, on the user interface, a visual representation of each foot and the distance; and
generating, on the user interface, a boundary around the visual representation, wherein the boundary is the second balance threshold, wherein the balance score is indicative of deviations of the center of mass from the first balance threshold and the second balance threshold.

5. The system of claim 3, wherein the processor is further configured to calculate the balance score based on both the deviations of the center of mass from the first balance threshold and a proximity of the center of mass to the second balance threshold.

6. The system of claim 5, wherein the processor is further configured to calculate the balance score by:
determining differences between the center of mass and points on the second balance threshold over the period of time; and
calculating the balance score based on a magnitude of the differences.

7. The system of claim 1, wherein the processor is further configured to:
- determine whether the balance score is less than a threshold balance score; and
- in response to determining that the balance score is less than a threshold balance score, generate an alert on the user interface.

8. The system of claim 1, wherein the processor is further configured to:
- establish a network connection with a different computing device;
- enable a video call between the computing device and the different computing device over the network connection, wherein a video stream of the video call is generated on the user interface;
- transfer the balance score to the different computing device;
- generate, for display, a plurality of historic balance scores on the user interface; and
- transmit the plurality of historic balance scores to the different computing device for display.

\* \* \* \* \*